(12) United States Patent
Inoue et al.

(10) Patent No.: US 11,939,027 B2
(45) Date of Patent: Mar. 26, 2024

(54) BICYCLE PEDAL

(71) Applicant: Shimano Inc., Osaka (JP)

(72) Inventors: Akira Inoue, Osaka (JP); Tatsuya Watanabe, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 246 days.

(21) Appl. No.: 17/130,518

(22) Filed: Dec. 22, 2020

(65) Prior Publication Data

US 2022/0194515 A1 Jun. 23, 2022

(51) Int. Cl.
*B62M 3/08* (2006.01)

(52) U.S. Cl.
CPC ..................... *B62M 3/08* (2013.01)

(58) Field of Classification Search
CPC .......... B62M 3/08; B62M 3/086; F16C 23/04; F16C 33/1025; F16C 35/063
USPC ........................................................ 74/594.4
See application file for complete search history.

(56) References Cited

U.S. PATENT DOCUMENTS

| 563,959 | A | * | 7/1896 | Grothe | ..................... | B62M 3/08 |
| | | | | | | 74/594.4 |
| 1,144,518 | A | * | 6/1915 | Yahle | ..................... | B62M 3/08 |
| | | | | | | 74/594.4 |
| 1,352,446 | A | | 9/1920 | Glanz | | |
| 4,838,115 | A | | 6/1989 | Nagano | | |
| 5,662,006 | A | | 9/1997 | Angeltun | | |
| 6,227,071 | B1 | * | 5/2001 | Coombe | .................. | B62M 3/08 |
| | | | | | | 384/454 |
| 9,003,921 | B2 | | 4/2015 | Weagle | | |
| 9,896,151 | B1 | * | 2/2018 | Hsieh | ..................... | B62M 3/086 |
| 10,000,254 | B2 | * | 6/2018 | Inoue | ..................... | B62M 3/086 |
| 10,683,056 | B1 | * | 6/2020 | Chen | ..................... | F16C 35/063 |
| 10,759,490 | B1 | * | 9/2020 | Chen | ....................... | F16C 23/04 |
| 10,780,942 | B1 | * | 9/2020 | Chen | ....................... | B62M 3/08 |
| 2008/0163721 | A1 | * | 7/2008 | Stevovich | ............... | B62M 3/08 |
| | | | | | | 74/594.4 |
| 2008/0295642 | A1 | | 12/2008 | Liou | | |

(Continued)

FOREIGN PATENT DOCUMENTS

| CN | 2808718 Y | 8/2006 |
| CN | 201095410 Y | 8/2008 |

(Continued)

OTHER PUBLICATIONS

Machine translation of CN 104527901 A, Xu, Apr. 22, 2015 (Year: 2015).*

(Continued)

*Primary Examiner* — Vinh Luong
(74) *Attorney, Agent, or Firm* — Global IP Counselors, LLP

(57) ABSTRACT

A bicycle pedal is provided with a pedal shaft, and a body part and an end cap. The pedal shaft has a center axis. The body part is rotatably supported by the pedal shaft around the center axis. The body part has a pedal shaft receiving bore with a first opening and a second opening. The first opening receives the pedal shaft along the center axis. The end cap is adjustably attached to the body part at the second opening to adjust a position of the pedal shaft within the pedal shaft receiving bore in an axial direction with respect to the center axis.

25 Claims, 10 Drawing Sheets

(56) References Cited

U.S. PATENT DOCUMENTS

| | | | |
|---|---|---|---|
| 2009/0078081 A1* | 3/2009 | French | B62M 3/08 |
| | | | 74/594.4 |
| 2012/0291590 A1 | 11/2012 | Chamberlain | |
| 2020/0086945 A1* | 3/2020 | Chen | B62M 3/08 |
| 2023/0271674 A1* | 8/2023 | Belknap | B62M 3/08 |
| | | | 74/594.4 |

FOREIGN PATENT DOCUMENTS

| | | | | |
|---|---|---|---|---|
| CN | 201287808 Y | * | 8/2009 | B62M 3/08 |
| CN | 202152096 U | | 2/2012 | |
| CN | 104527901 A | * | 4/2015 | B62M 3/086 |
| CN | 205707128 U | | 11/2016 | |
| CN | 208602634 U | | 3/2019 | |
| DE | 20 2009 014 025 U1 | | 2/2010 | |
| EP | 2 170 690 B1 | | 5/2013 | |
| JP | 40-23452 U | | 8/1965 | |
| JP | 63-172795 U | | 11/1988 | |
| JP | 63-176893 U | | 11/1988 | |
| JP | 64-39192 U | | 3/1989 | |
| JP | 2546149 Y2 | | 8/1997 | |
| JP | 3204302 U | | 4/2016 | |
| TW | M332062 U | | 5/2008 | |
| TW | M339462 U | | 9/2008 | |
| TW | M360204 U | | 7/2009 | |
| TW | M376517 U | | 3/2010 | |
| TW | M381585 U | | 6/2010 | |
| TW | M453638 U | | 5/2013 | |

OTHER PUBLICATIONS

Machine translation of CN 201287808 Y, Xie, Aug. 12, 2009 (Year: 2009).*

* cited by examiner

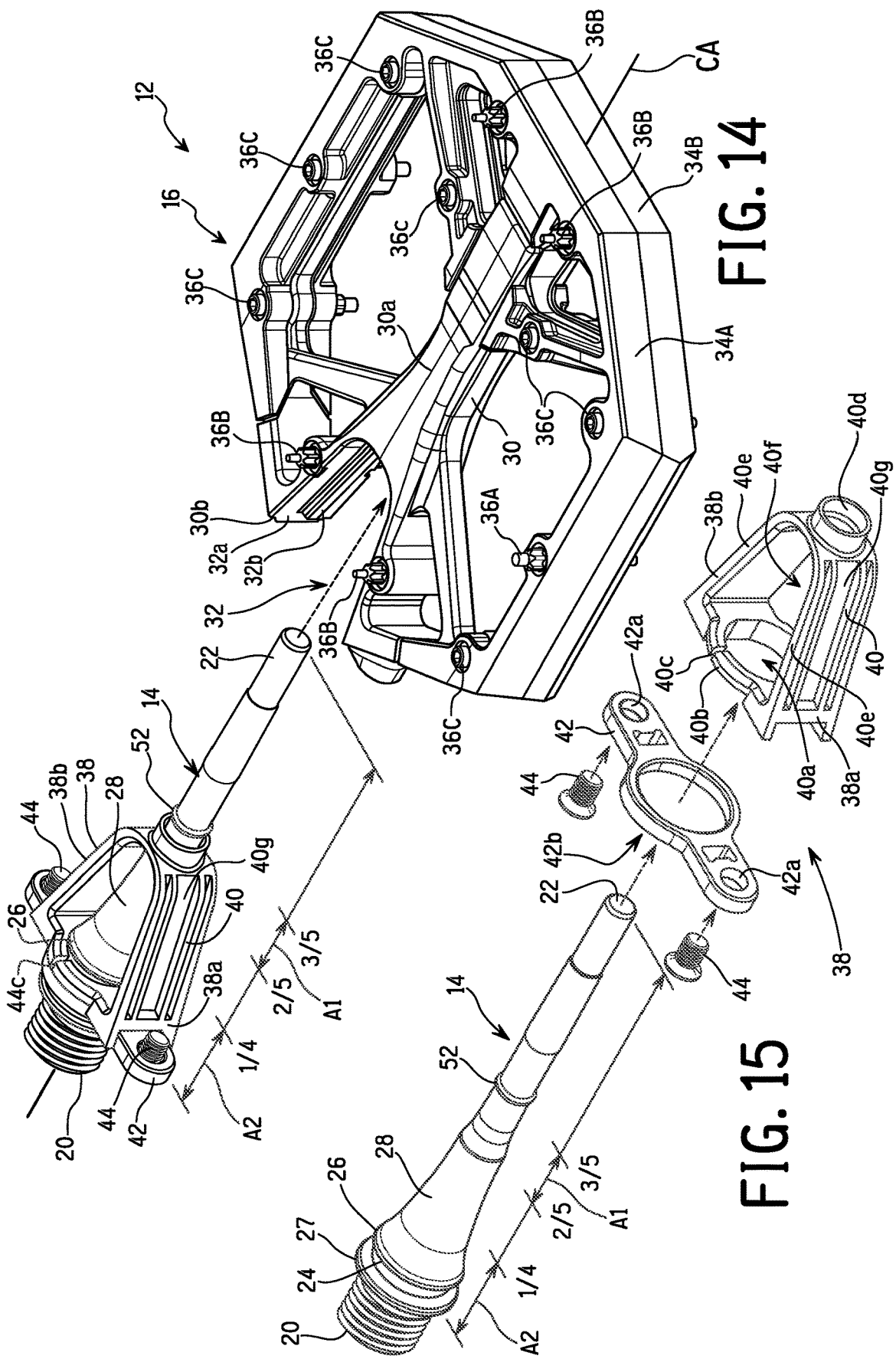

BICYCLE PEDAL

BACKGROUND

Technical Field

This disclosure generally relates to a bicycle pedal. More specifically, the present disclosure relates to a bicycle pedal having a pedal shaft and a body part rotatably supported by the pedal shaft.

Background Information

Generally, a bicycle pedal is an essential component of most bicycles which is used to transfer cycling power to the bicycle's drive train. Different styles of bicycles utilize different pedal styles that are designed for a specific purpose such as for pleasure, off road biking, road racing, etc. Typically, a bicycle pedal includes a pedal shaft and a pedal body, with the pedal shaft rotatably supporting the pedal body at the end of a crank which is attached to the drive train. When a rider drives the crank by pedaling the pedal body, the rotation of the crank causes the rotation one or more wheel of the bicycle.

SUMMARY

Generally, the present disclosure is directed to various features of a bicycle pedal for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a bicycle pedal is provided that comprises a pedal shaft, a body part and an end cap. The pedal shaft has a center axis. The body part is rotatably supported by the pedal shaft around the center axis. The body part has a pedal shaft receiving bore with a first opening and a second opening. The first opening receives the pedal shaft along the center axis. The end cap is adjustably attached to the body part at the second opening to adjust a position of the pedal shaft within the pedal shaft receiving bore in an axial direction with respect to the center axis. With the bicycle pedal according to the first aspect, it is possible to adjust the rotational torque of the body part with respect to the pedal shaft.

In accordance with a second aspect of the present disclosure, the bicycle pedal according to the first aspect further comprises a first projection provided to the pedal shaft. The end cap is adjustable with respect to the body part to adjust a position of the first projection in the axial direction with respect to the body part. With the bicycle pedal according to the second aspect, it is possible to use the first projection to adjust the rotational torque of the body part with respect to the pedal shaft.

In accordance with a third aspect of the present disclosure, the bicycle pedal according to the second aspect is configured so that the first projection includes at least one of a first O-ring and a protrusion. The protrusion is provided on the pedal shaft. With the bicycle pedal according to the third aspect, it is possible to easily move the first protrusion during adjustment of the pedal shaft.

In accordance with a fourth aspect of the present disclosure, the bicycle pedal according to the third aspect is configured so that the first projection includes the protrusion and the first O-ring, and the first O-ring is disposed on the protrusion. With the bicycle pedal according to the fourth aspect, it is possible to fix the first O-ring to the protrusion so that the O-ring moves with the pedal shaft during adjustment of the pedal shaft.

In accordance with a fifth aspect of the present disclosure, the bicycle pedal according to the third or fourth aspect is configured so that the first O-ring is a sealing ring. With the bicycle pedal according to the fifth aspect, it is possible to seal an inner portion of the bicycle pedal from water and debris.

In accordance with a sixth aspect of the present disclosure, the bicycle pedal according to any of the second to fifth aspects further comprises a second projection provided to the pedal shaft. The end cap is adjustable with respect to the body part to adjust a distance between the first projection and the second projection in the axial direction. With the bicycle pedal according to the sixth aspect, it is possible to use the second projection to adjust the rotational torque of the body part with respect to the pedal shaft.

In accordance with a seventh aspect of the present disclosure, the bicycle pedal according to the sixth aspect is further configured so that the bicycle pedal comprises a retaining part that limits movement of the second projection within the pedal shaft receiving bore in the axial direction towards the first opening. The end cap is adjustable with respect to the body part to adjust the first projection in the axial direction with respect to the body part towards the second projection. With the bicycle pedal according to the seventh aspect, it is possible to fix the position of the second projection within the pedal shaft receiving bore.

In accordance with an eighth aspect of the present disclosure, the bicycle pedal according to the seventh aspect is configured so that the second projection includes a second O-ring. With the bicycle pedal according to the eighth aspect, it is possible to easily encircle the pedal shaft with the second projection.

In accordance with a ninth aspect of the present disclosure, the bicycle pedal according to the eighth aspect is configured so that the second O-ring is a sealing ring. With the bicycle pedal according to the ninth aspect, it is possible to seal an inner portion of the bicycle pedal from water and debris.

In accordance with a tenth aspect of the present disclosure, the bicycle pedal according to any of the sixth to ninth aspects is configured so that the end cap is adjustable with respect to the body part to cause the first projection to contact the second projection. With the bicycle pedal according to the tenth aspect, it is possible to adjust the rotational torque of the body part with respect to the pedal shaft by adjusting the end cap.

In accordance with an eleventh aspect of the present disclosure, the bicycle pedal according to any of the sixth to tenth aspects is configured so that the first projection and the second projection are located within the pedal shaft receiving bore. With the bicycle pedal according to the eleventh aspect, it is possible to seal the pedal shaft receiving bore with the first projection and the second projection.

In accordance with a twelfth aspect of the present disclosure, the bicycle pedal according to any of the first to eleventh aspects is configured so that the end cap has a non-cylindrical outer surface that is at least partly located outside of the pedal shaft receiving bore. With the bicycle pedal according to the twelfth aspect, it is possible to control intermittent adjustment of the pedal shaft with respect to the body part using the end cap.

In accordance with a thirteenth aspect of the present disclosure, the bicycle pedal according to the twelfth aspect is configured so that the non-cylindrical outer surface has a polygonal shape. With the bicycle pedal according to the thirteenth aspect, it is possible to control intermittent adjustment of the pedal shaft with respect to the body part using the end cap.

In accordance with a fourteenth aspect of the present disclosure, the bicycle pedal according to the twelfth or thirteenth aspect further comprises at least one tread part attached to the body part. The at least one tread part has a recess with an inner surface that at least partially mates with the non-cylindrical outer surface of the end cap. With the bicycle pedal according to the fourteenth aspect, it is possible to ensure that the end cap is in a desired configuration.

In accordance with a fifteenth aspect of the present disclosure, the bicycle pedal according to the fourteenth aspect is configured so that the at least one tread part includes a first tread part having a first inner surface which mates with the non-cylindrical outer surface of the end cap and a second tread part having a second inner surface which mates with the non-cylindrical outer surface of the end cap. With the bicycle pedal according to the fifteenth aspect, it is possible to ensure that the end cap is in a desired configuration.

In accordance with a sixteenth aspect of the present disclosure, a bicycle pedal is provided that comprises a pedal shaft and a pedal body. The pedal shaft has a first end portion, a second end portion, an intermediate portion and a first protrusion extending radially outward with respect to a center axis of the pedal shaft. The first protrusion is located between the first end portion and the second end portion. The pedal body is rotatably supported by the pedal shaft around the center axis. The pedal body includes a body part defining a pedal shaft receiving bore receiving the second end portion of the pedal shaft and a retaining part defining a pedal shaft receiving aperture receiving the intermediate portion of the pedal shaft at a location outside of the pedal shaft receiving bore. The first protrusion extends radially outward with respect the center axis to at least partially overlap with a retaining portion of the retaining part as viewed in an axial direction of the pedal shaft. With the bicycle pedal according to the sixteenth aspect, it is possible to prevent the bicycle pedal from breaking off of a bicycle crank during use.

In accordance with a seventeenth aspect of the present disclosure, the bicycle pedal according to the sixteenth aspect is configured so that the retaining portion of the retaining part includes a retaining section defining the pedal shaft receiving aperture, and the retaining section at least partially overlaps with the first protrusion as viewed in the axial direction of the pedal shaft. With the bicycle pedal according to the seventeenth aspect, it is possible to prevent the bicycle pedal from breaking off of a bicycle crank during use.

In accordance with an eighteenth aspect of the present disclosure, the bicycle pedal according to the sixteenth or seventeenth aspect is configured so the retaining part includes at least one slit that is arranged to provide radial expansion of the retaining part to be installed onto the pedal shaft. With the bicycle pedal according to the eighteenth aspect, it is possible to easily fit the retaining part around the pedal shaft.

In accordance with a nineteenth aspect of the present disclosure, the bicycle pedal according to any of the sixteenth to eighteenth aspects is configured so that the retaining part includes a first side and a second side, and the first side splits from the second side to position the pedal shaft receiving aperture around the intermediate portion of the pedal shaft. With the bicycle pedal according to the nineteenth aspect, it is possible to easily fit the retaining part around the pedal shaft.

In accordance with a twentieth aspect of the present disclosure, the bicycle pedal according to any of the sixteenth to nineteenth aspects is configured so that the pedal shaft has a second protrusion extending radially outward with respect to the center axis, the pedal shaft receiving aperture of the retaining part is positioned around the intermediate portion of the pedal shaft, and the intermediate portion is positioned between the first protrusion and the second protrusion. With the bicycle pedal according to the twentieth aspect, it is possible to easily retain a broken pedal shaft to the bicycle crank using the retaining part.

In accordance with a twenty-first aspect of the present disclosure, the bicycle pedal according to the twentieth aspect is configured so that the second protrusion extends radially outward with respect the center axis to at least partially overlap with the retaining portion of the retaining part as viewed in the axial direction of the pedal shaft. With the bicycle pedal according to the twenty-first aspect, it is possible to easily retain a broken pedal shaft to the bicycle crank using the retaining part.

In accordance with a twenty-second aspect of the present disclosure, the bicycle pedal according to any of the sixteenth to twenty-first aspects is configured so that the retaining part includes a support portion, the retaining portion includes the pedal shaft receiving aperture, and the support portion attaches the retaining portion to the body part. With the bicycle pedal according to the twenty-second aspect, it is possible to securely attach the retaining part to the body part.

Also, other objects, features, aspects and advantages of the disclosed bicycle pedal will become apparent to those skilled in the art from the following detailed description, which, taken in conjunction with the annexed drawings, discloses preferred embodiments of the bicycle pedal.

BRIEF DESCRIPTION OF THE DRAWINGS

Referring now to the attached drawings which form a part of this original disclosure:

FIG. 14 is another exploded top perspective view of the bicycle pedal illustrated in FIG. 1;

FIG. 15 is an exploded top perspective view of the pedal shaft and the retaining part of the bicycle pedal illustrated in FIG. 1;

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
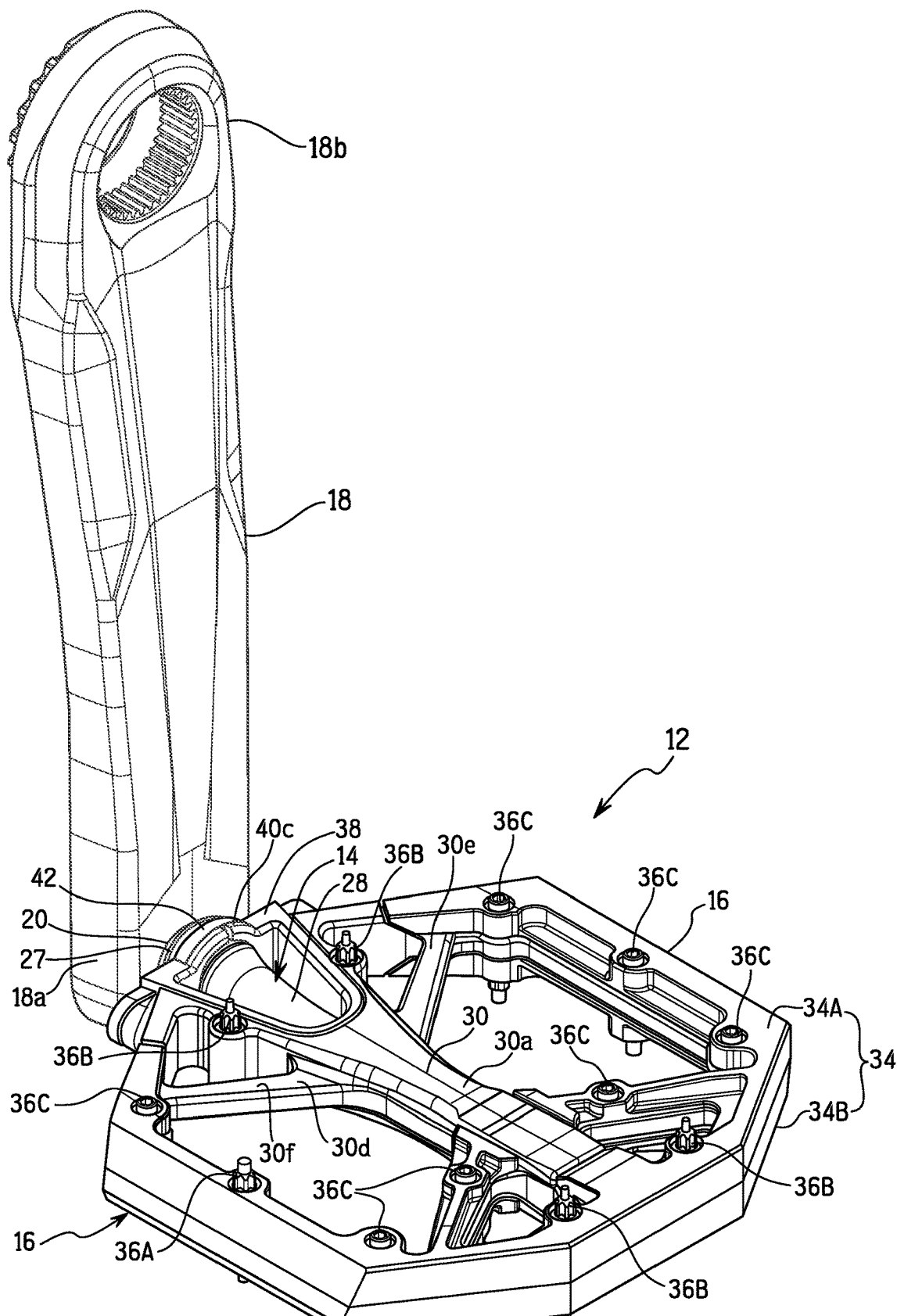
FIG. 1 is a top perspective view of a bicycle crank arm having a bicycle pedal in accordance with one embodiment.

Referring initially to FIG. 1, a bicycle pedal 12 for a human-powered vehicle in accordance with a first embodiment. The bicycle pedal 12 comprises a pedal shaft 14. The pedal shaft 14 has a center axis CA. The bicycle pedal 12 also comprises a pedal body 16. The pedal body 16 is rotatably supported by the pedal shaft 14 around the center axis CA. The pedal shaft 14 connects the pedal body 16 to the outer end 18a of a bicycle crank arm 18 such that the pedal body 16 is configured to rotate with respect to the bicycle crank arm 18 around the center axis CA of the pedal shaft 14. The inner end 18b of the bicycle crank arm 18 is configured to be attached to a drive train of the human-powered vehicle, such that use of the bicycle pedal 12 rotates the bicycle crank 18 and causes the rotation of one or more wheel of the human-powered vehicle.

FIGS. 5 to 9, 14 and 15 show the pedal shaft 14 in more detail. As illustrated, the pedal shaft 14 is an elongated rod which has a longitudinal length extending along the center axis CA. Here, the pedal shaft 14 has a first end portion 20, a second end portion 22, and an intermediate portion 24. Each of the first end portion 20, the second end portion 22, and the intermediate portion 24 is located along the center axis CA. The pedal shaft 14 can be formed, for example, as a single part made of a metal material such as carbon steel or chrome molybdenum steel.

The first end portion 20 is configured to be attached to the bicycle crank arm 18. More specifically, the first end portion 20 is configured to be attached to the outer end 18a of the bicycle crank arm 18. For attachment to the bicycle crank arm 18, the first end portion 20 includes at least one of an outer thread 20a and a crank attachment bore 20b. Here, the outer thread 20a encircles the perimeter of the first end portion 20 and is configured to be threaded into a corresponding aperture at the outer end 18a of the bicycle crank arm 18. A screw, nut and bolt, or other attachment device is then screwed into the crank attachment bore 20b from the opposite side of the outer end 18a. In this way, the pedal shaft 14 rotatably supports the pedal body 16 relative to the bicycle crank arm 18, with the pedal body 16 rotating around the center axis CA of the pedal shaft 14.

Figure 5:
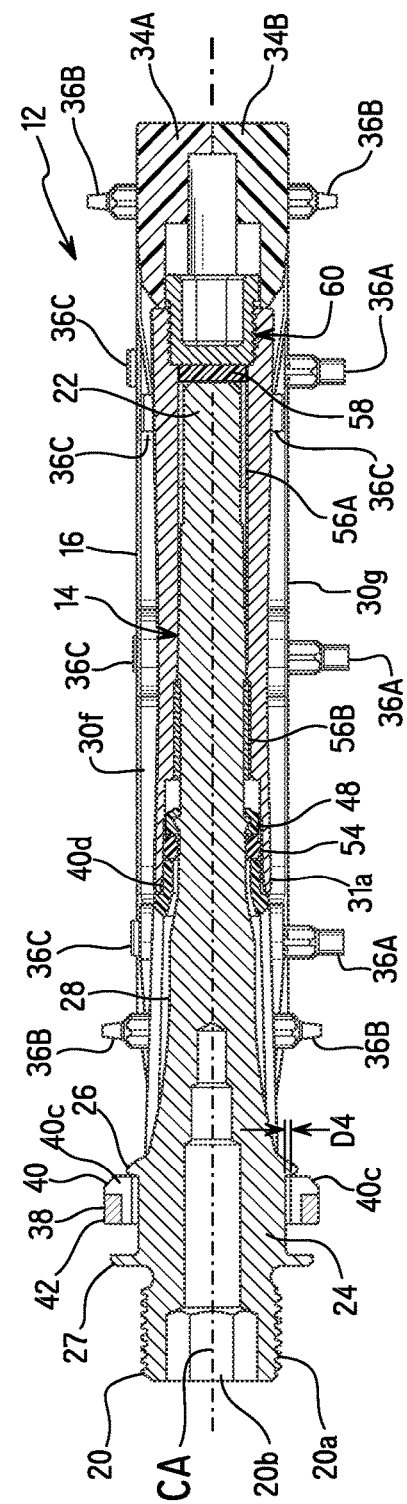
FIG. 5 is a side cross-sectional view, taken from a section line 5-5 in FIG. 2, showing the bicycle pedal illustrated in FIG. 1 in a first configuration.
Figure 6:
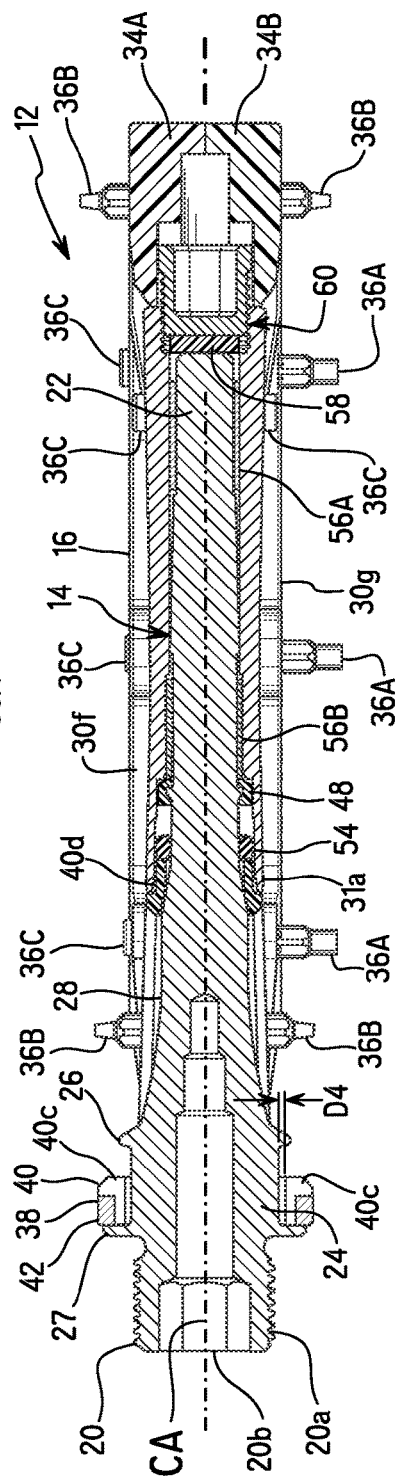
FIG. 6 is a side cross-sectional view showing the bicycle pedal as viewed in FIG. 5 in a second configuration.
Figure 9:
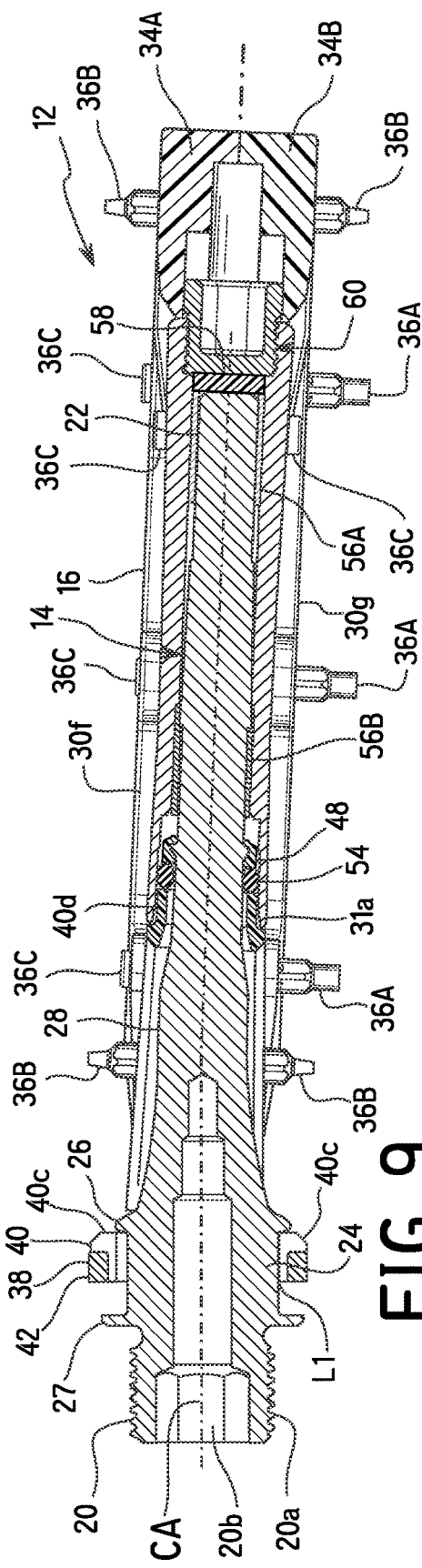
FIG. 9 is a side cross-sectional view showing the bicycle pedal as viewed in FIG. 5 as a load is applied by a rider.

The second end portion 22 is located on an opposite side of the pedal shaft 14 as the first end portion 20 in an axial direction with respect to the center axis CA. As described in more detail below, the second end portion 22 is configured to slide into the pedal body 16 so as to rotatably support the pedal body 16 on the bicycle crank 18. As seen in FIGS. 5, 6 and 9, the diameter of the pedal shaft 14 remains constant or substantially constant proximal to the second end portion 22 to facilitate entry of the second end portion 22 into the pedal body 16 and to enable the pedal body 16 to rotate freely around the second end portion 22. The pedal shaft 14 generally has a larger diameter at the first end portion 20 than at the second end portion 22. Since a large load is applied to the large diameter portion of the pedal shaft 14, it is easy to obtain the strength of the pedal shaft 14 against the load.

The intermediate portion 24 is located between the first end portion 20 and the second end portion 22 in the axial direction of the center axis CA of the pedal shaft 14. As described in more detail below, the intermediate portion 24 of the pedal shaft 14 is configured to contact a portion of the pedal body 16 when a load is applied by a rider, thus absorbing at least part of the rider's load. However, the intermediate portion 24 does not contact the same portion of the pedal body 16 under a no load condition. Here, the intermediate portion 24 is located proximal to the first end portion 20 in comparison to the second end portion 22 in the axial direction of the center axis CA. In this way, the intermediate portion 24 is located proximal to the outer end 18a of the bicycle crank arm 18 when the pedal shaft 14 is attached to the bicycle crank arm 18. This enables the rider's load to be distributed near the bicycle crank 18, thus decreasing the amount of vertical displacement of the pedal body 16 caused by the rider's load.

The pedal shaft 14 has a first protrusion 26. The first protrusion 26 is located between the first end portion 20 and the second end portion 22. More specifically, the first protrusion 26 is located between the first end portion 20 and the second end portion 22 in the axial direction of the center axis CA of the pedal shaft 14. The first protrusion 26 is also located between the second end portion 22 and the intermediate portion 24 in the axial direction of the center axis CA of the pedal shaft 14. The first protrusion 26 extends radially outward with respect to the center axis CA of the pedal shaft 14. The first protrusion 26 extends radially outward from the pedal shaft 14 with respect to the center axis CA of the pedal shaft 14. The first protrusion 26 has an outermost diameter that is larger than the outermost diameter of the intermediate portion 24. As used herein, the "outermost diameter" refers to the largest diameter of a respective portion of the pedal shaft 14. Here, as seen in FIG. 15, the first protrusion 26 encircles the center axis CA with a constant diameter.

However, the first protrusion 26 can also include one or more gaps in its outermost diameter in the circumferential direction with respect to the center axis CA as viewed in the axial direction of the center axis CA of the pedal shaft 14. For example, the first protrusion 26 can have gaps which have the same diameter as the outermost diameter of the intermediate portion 24. The first protrusion 26 can also include a single protrusion which extends radially outward with respect to the center axis CA of the pedal shaft 14 in only one direction. The first protrusion 26 can also include multiple single protrusions which extend radially outward with respect to the center axis CA of the pedal shaft 14 in multiple directions.

The pedal shaft 14 has a second protrusion 27. The second protrusion 27 is located between the first end portion 22 and the second end portion 24 in the axial direction of the center axis CA of the pedal shaft 14. The second protrusion 27 is also located between the first end portion 20 and the intermediate portion 24 in the axial direction of the center axis CA of the pedal shaft 14. The second protrusion 27 extends radially outward with respect to the center axis CA. The second protrusion 27 extends radially outward from the pedal shaft 14 with respect to the center axis CA of the pedal shaft 14. As seen in FIGS. 5 and 6, the second protrusion 27 extends further radially outward with respect to the center axis CA than the first protrusion 26. The second protrusion 27 has an outermost diameter that is larger than the outermost diameter of the intermediate portion 24. The second protrusion 27 also has an outermost diameter that is larger than the outermost diameter of the first protrusion 26. Here, as seen in FIG. 15, the second protrusion 27 encircles the center axis CA with a constant radius. However, the second protrusion 27 can also include one or more gaps in its outermost diameter in the circumferential direction with respect to the center axis CA as viewed in the axial direction of the center axis CA of the pedal shaft 14. For example, the second protrusion 27 can have gaps which have the same diameter as the outermost diameter of the intermediate portion 24. The second protrusion 27 can also include a single protrusion which extends radially outward with respect to the center axis CA of the pedal shaft 14 in only one direction. The second protrusion 27 can also include multiple single protrusions which extend radially outward with respect to the center axis CA of the pedal shaft 14 in multiple directions. The second protrusion 27 is also configured to abut the bicycle crank arm 18 when the pedal shaft 14 is attached to the bicycle crank 18.

The intermediate portion 24 is positioned between the first protrusion 26 and the second protrusion 27. Here, as seen in FIGS. 5 and 6, the outermost diameter of the intermediate portion 24 is basically constant between the first protrusion 26 and the second protrusion 27. The outermost diameter of the intermediate portion 24 is also larger than the outermost diameter of the second end portion 22. This way, a thicker section of the pedal shaft 14 at the intermediate portion 24 is configured to receive at least part of the rider's load applied nearer to a thinner section of the pedal shaft 14 at the second end portion 22.

As seen in FIGS. 14 and 15, the intermediate portion 24 of the pedal shaft 14 can be provided, for example, in an area A2 from the second protrusion 27 to ¼ of the axial length of the pedal shaft 14. The axial position of the intermediate portion 24 can be represented by a center position of the axial length of the intermediate portion 24 of the pedal shaft 14. As seen in FIG. 15, the axial length of the pedal shaft 14 is from the second protrusion 27 in the axial direction to the tip of the second end portion 22. That is, the axial length of the pedal shaft 14 is the length of the pedal shaft 14 excluding the outer thread 20a.

Figure 2:
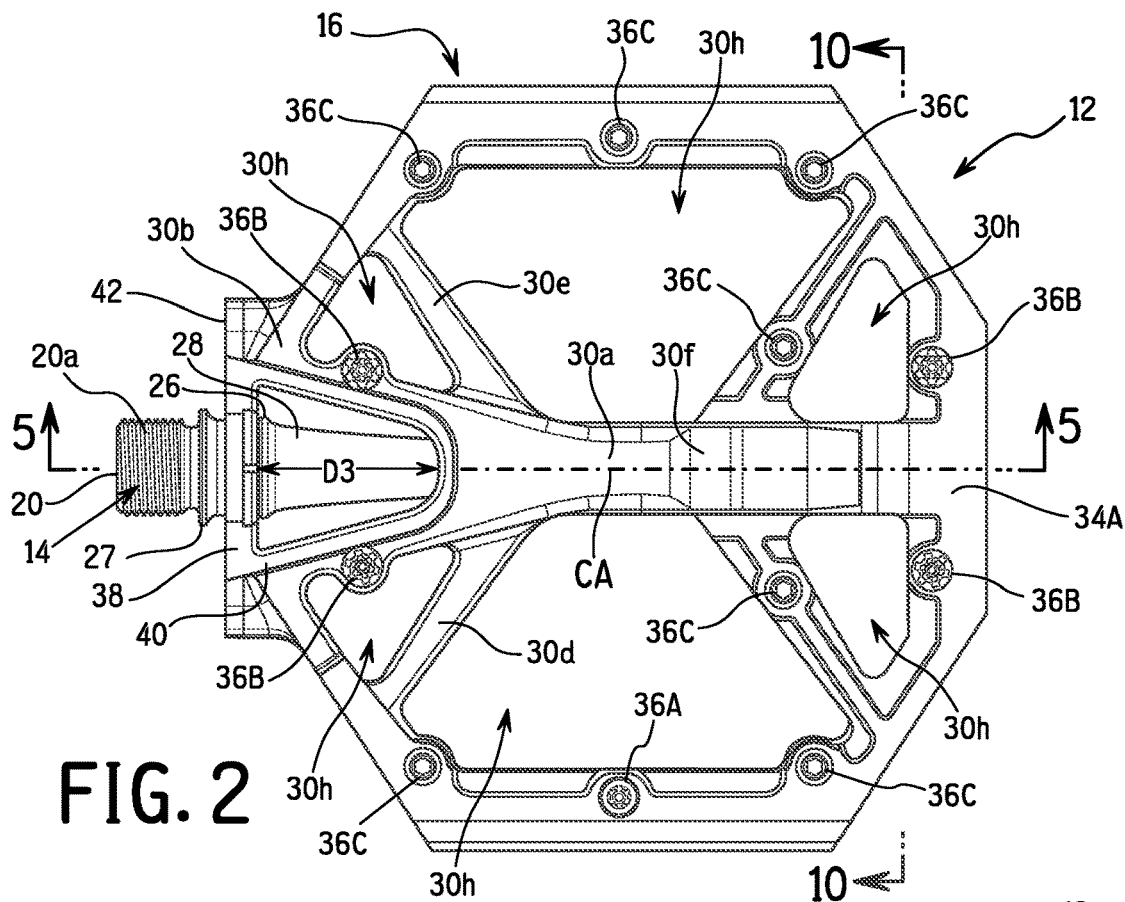
FIG. 2 is a top plan view of the bicycle pedal illustrated in FIG. 1.
Figure 3:
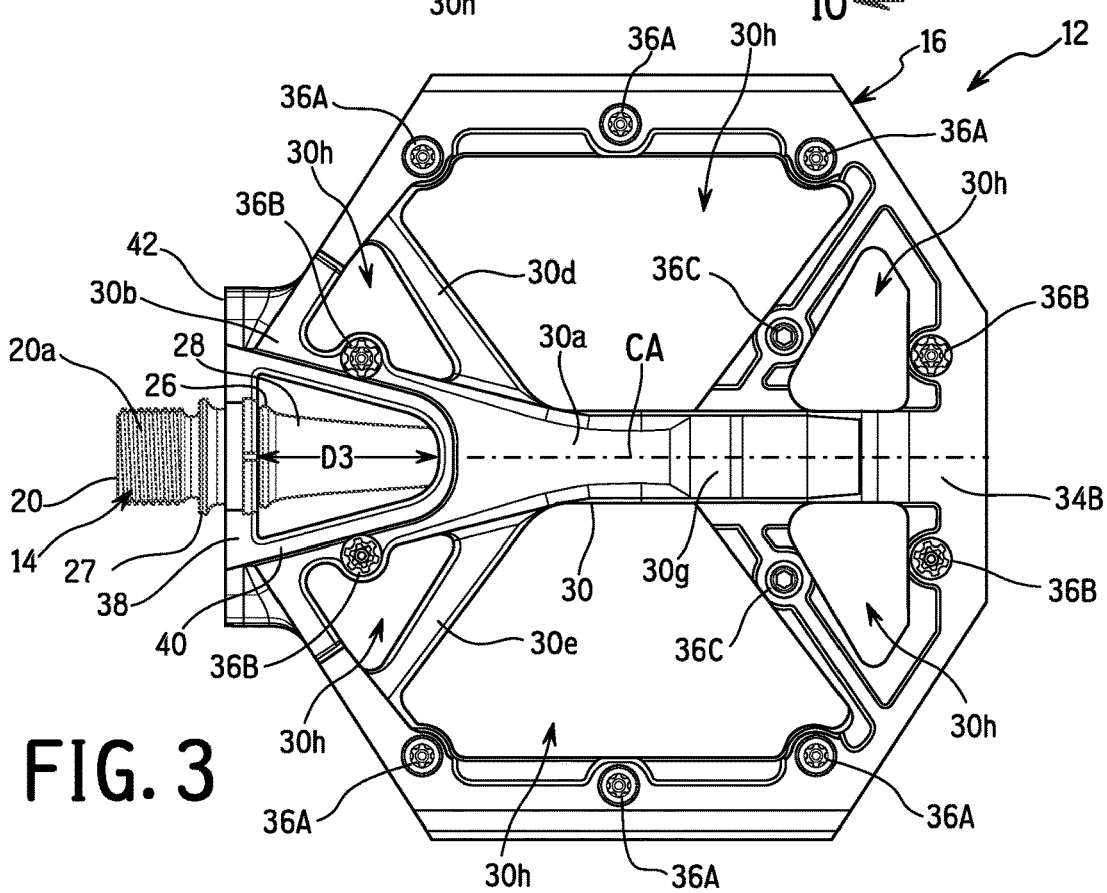
FIG. 3 is a bottom plan view of the bicycle pedal illustrated in FIG. 1.
Figure 4:
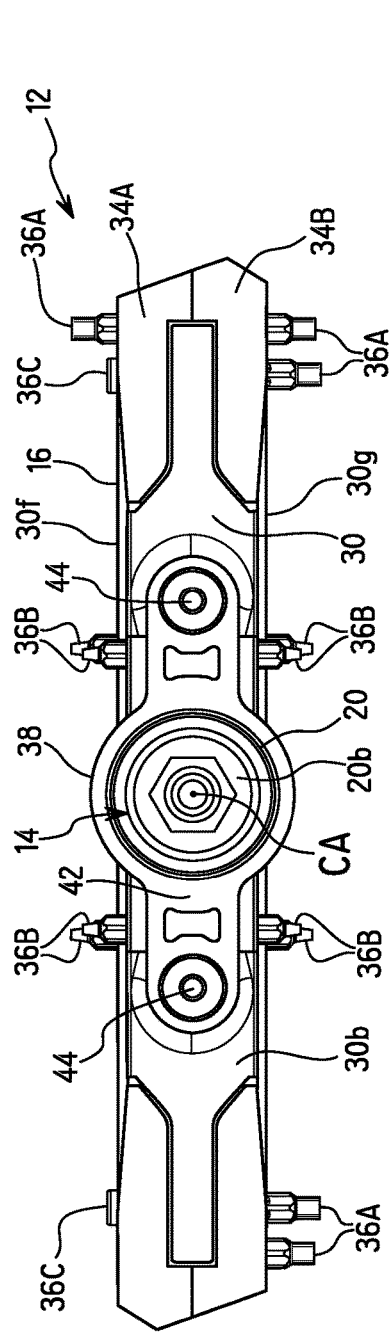
FIG. 4 is an inside elevational view of the bicycle pedal illustrated in FIG. 1.

As seen in FIGS. 1 to 3, the pedal shaft 14 includes an exposed portion 28. The exposed portion 28 of the pedal shaft 14 is located between the intermediate portion 24 and the second end portion 22 in the axial direction of the center axis CA of the pedal shaft 14. The exposed portion 28 is also located between the first protrusion 26 and the second end portion 22 in the axial direction of the center axis CA of the pedal shaft 14. Here, the exposed portion 28 is exposed outside of the pedal body 16 between the intermediate portion 24 and the second end portion 22. By exposing the exposed portion 28 in this manner, the pedal shaft 14 is able to flex at the exposed portion 28 under a rider's load without rubbing against an inner surface of the pedal body 16, while at the same time enabling transfer of at least part of the rider's load to the intermediate portion 24. Here, as seen in FIGS. 5 and 6, the diameter of the exposed portion 28 generally tapers inwardly to decrease from the first protrusion 26 toward the second end portion 22.

Figure 16:
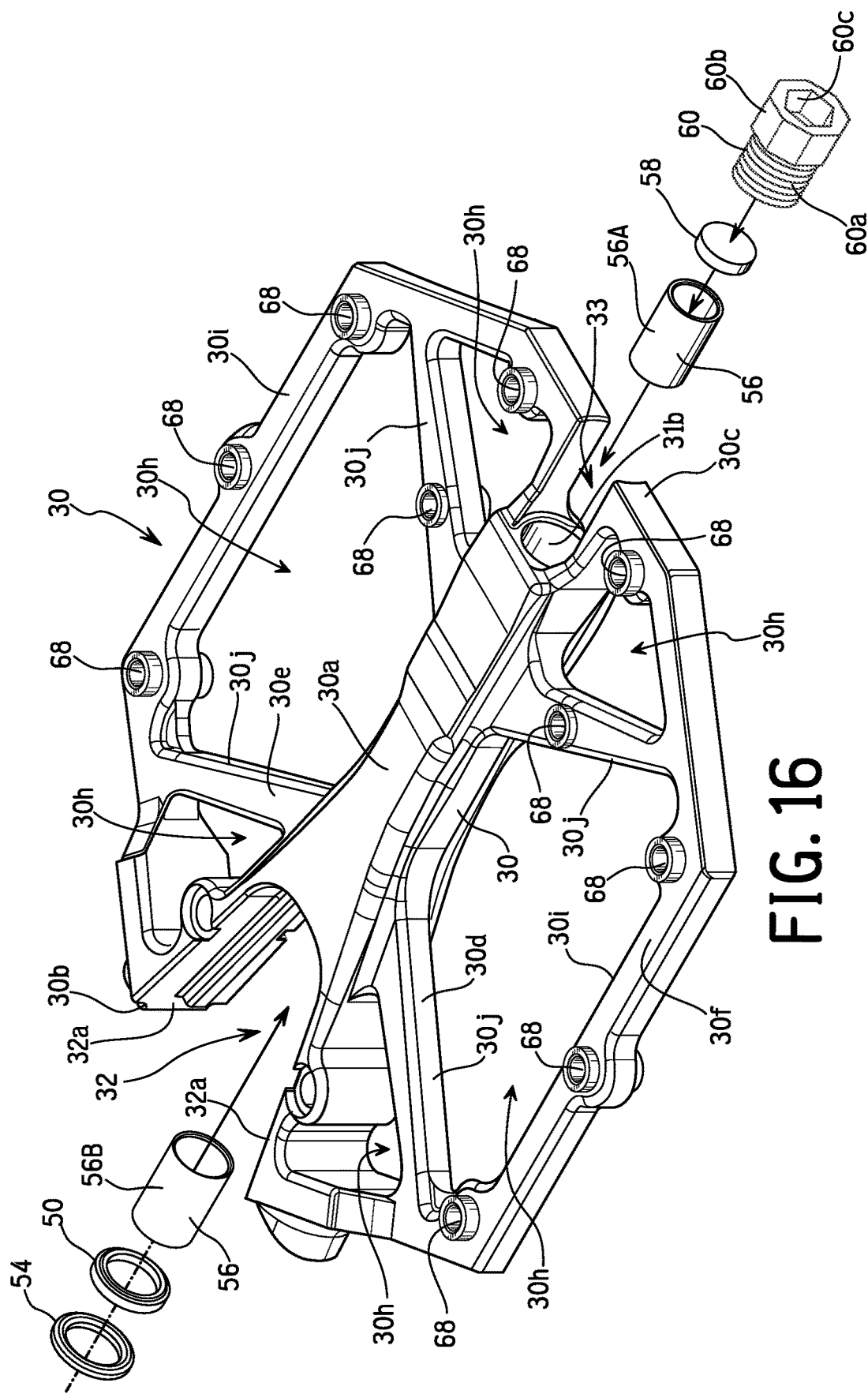
FIG. 16 is an exploded top perspective view of the body part of the bicycle pedal illustrated in FIG. 1.
Figure 17:
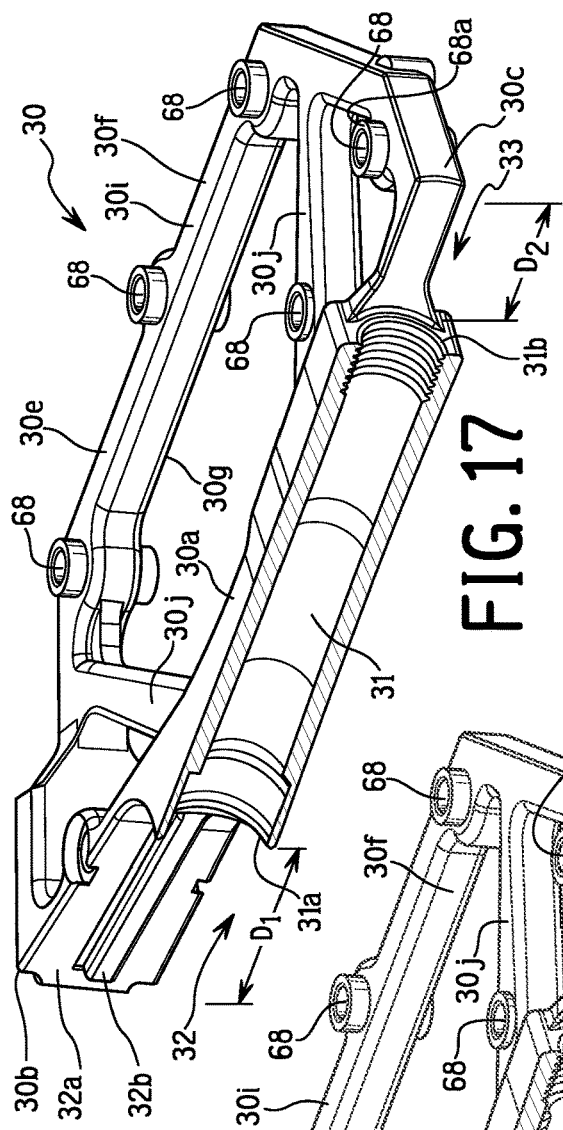
FIG. 17 is a cross-sectional perspective view showing half of the body part shown in FIG. 16.
Figure 18:
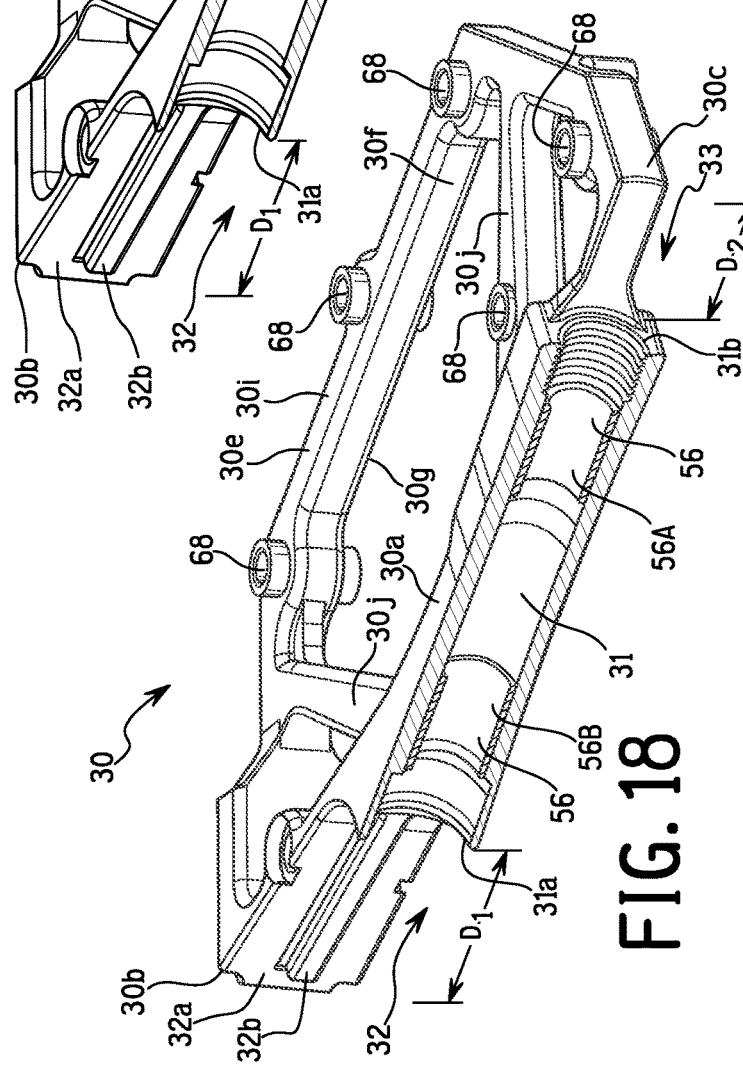
FIG. 18 is a cross-sectional perspective view showing half of the body part shown in FIG. 16 with sliding bearings installed.

The bicycle pedal 12 comprises a body part 30. More specifically, the pedal body 16 comprises the body part 30. The body part 30 receives the pedal shaft 14. The body part 30 is rotatably supported by the pedal shaft 14 around the center axis AR. As seen in FIGS. 16 to 18, the body part 30 includes a center portion 30a which extends along the center axis CA of the pedal shaft 14 from a crank end side 30b to a free end side 30c, a first side portion 30d which extends radially outward from one side of the center portion 30a with respect to the center axis CA, and a second side portion 30e which extends radially outward from the opposite side of the center portion 30a with respect to the center axis CA. For example, in the case where the body part 30 is plate-shaped, the first side portion 30d and the second side portion 30e are portions in the lateral direction around the rotation axis CA of the body part 30. The body part 30 includes a first side 30f and a second side 30g that is on an opposite side of the first side 30f with respect to the body part 30. For example, in the case where the body part 30 is plate-shaped, the first side 30f and the second side 30g correspond to the front side and the back side of the body part 30. The first side 30f and the second side 30g face each other in the thickness direction of the body part 30. An axis parallel to the thickness direction, an axis parallel to the lateral direction, and the center axis CA are orthogonal to each other. The center portion 30a, the first side portion 30d, and the second side portion 30e extend between the first side 30f (e.g., the "top" side in FIGS. 16 to 18) and the second side 30g (e.g., the "bottom" side in FIGS. 16 to 18). The first side portion 30d and the second side portion 30e further include one or more aperture 30h, which are be strategically placed and decrease the overall weight and material cost of the body part 30. As seen for example in FIG. 16, the plurality of apertures 30h cause each of the first side portion 30d and the second side portion 30e to have an outer perimeter section 30i connected to the center portion 30a by one or more connecting section 30j.

The body part 30 has a pedal shaft receiving bore 31. The body part 30 defines the pedal shaft receiving bore 31. More specifically, the center portion 30a of the body part 30 defines the pedal shaft receiving bore 31. The pedal shaft receiving bore 31 receives the pedal shaft 14. More specifically, the pedal shaft receiving bore 31 receives the second end portion 22 of the pedal shaft 14. The pedal shaft receiving bore 31 has a first opening 31a and a second opening 31b. As seen in FIGS. 17 and 18, the first opening 31a is offset from the crank end side 30b of the body part 30 by a distance D1 to create a first gap 32, while the second opening 31b is offset from the free end side 30c of the body part 30 by a distance D2 to create a second gap 33. The first gap 32 is located between the first opening 31a and the crank end side 30b in the axial direction of the pedal shaft 14. The second gap 33 is located between the second opening 31b and the free end side 30c in the axial direction of the pedal shaft 14. The first opening 31a receives the pedal shaft 16 along the center axis CA. As seen in FIG. 14, the first opening 31a receives the second end portion 22 of the pedal shaft 14. As seen in FIGS. 5 and 6, when the first opening 31a receives the pedal shaft 14, the second end portion 22 is located proximal to the second opening 31b.

Figure 12:
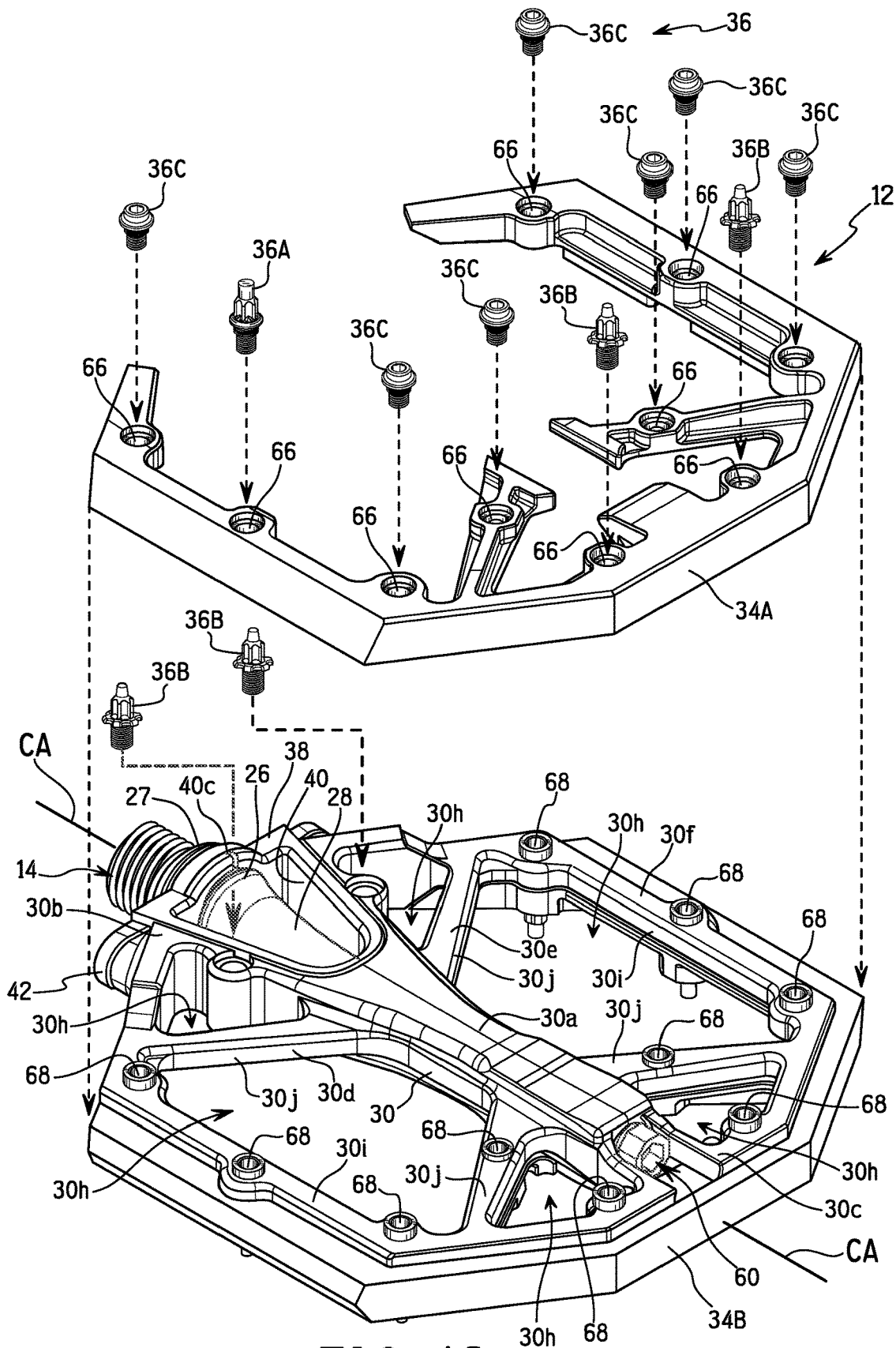
FIG. 12 is an exploded top perspective view of the top of the bicycle pedal illustrated in FIG. 1.
Figure 13:
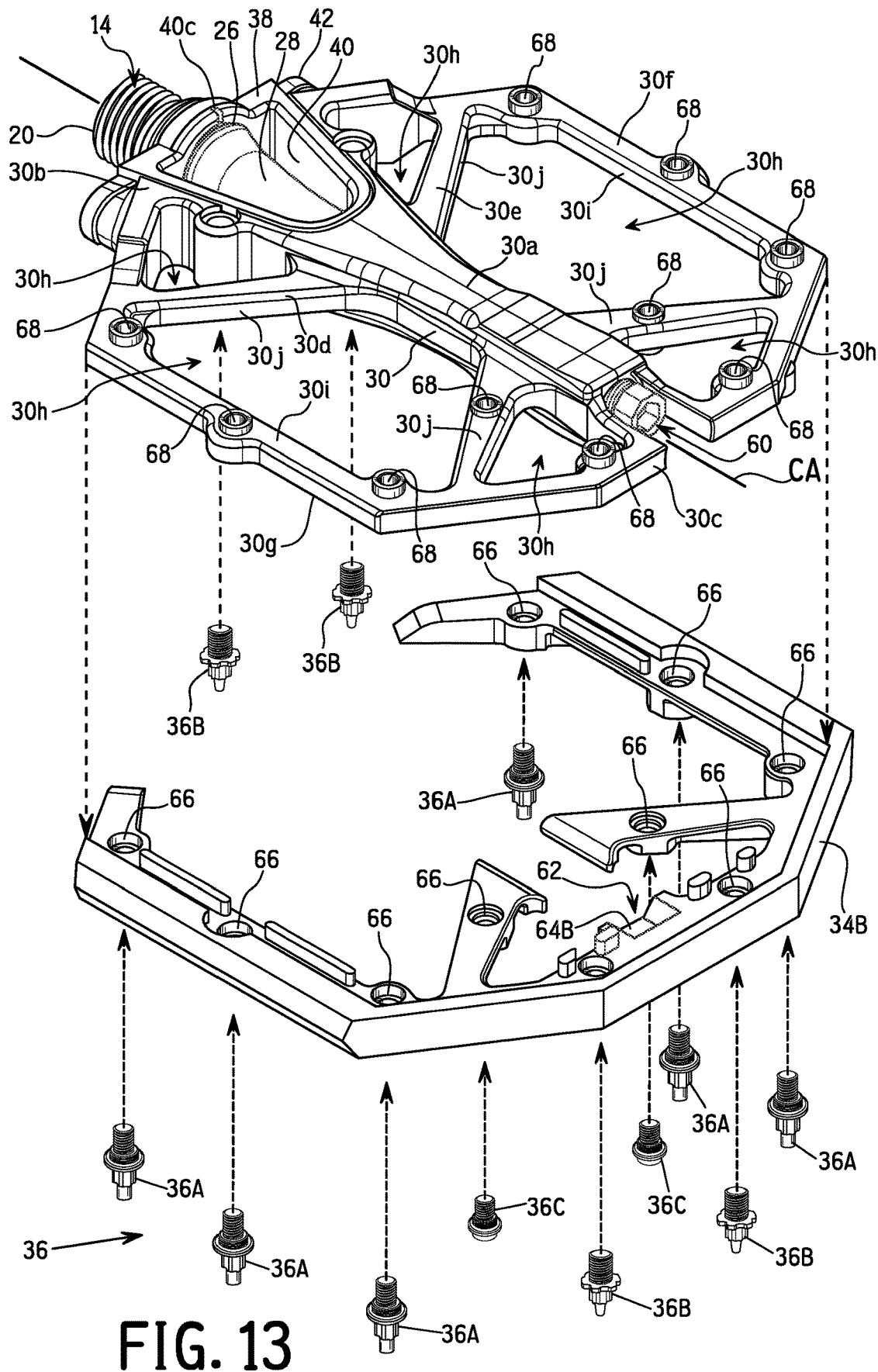
FIG. 13 is an exploded top perspective view of the bottom of the bicycle pedal illustrated in FIG. 1.

The bicycle pedal 12 comprises at least one tread part 34 attached to the body part 30. More specifically, the pedal body 16 comprises at least one tread part 34 attached to the body part 30. As seen in FIGS. 12 and 13, the at least one tread part 34 is formed separately from the body part 30. Here, the at least one tread part 34 includes a first tread part 34A and a second tread part 34B. The first tread part 34A is attached to the first side 30f of the body part 30, and the second tread part 34B is attached to the second side 30g of the body part 30. The at least one tread part 34 can be made of resin. The resin is advantageous, for example, because it improves the rider's grip on the bicycle pedal 12 and does not easily wear due to contact with the rider's shoe. Resin also makes the pedal lighter and restricts a fastener from loosening. However, the material is not limited to resin. At least when the effect of restricting the fastener from loosening is not expected, the tread part can be made of a material other than resin. By making a tread part 34 removably attachable as shown, a rider is able to replace the tread part 34 or interchangeably use different tread parts 34 as desired. The different tread parts 34 can be, for example, made of different materials or formed with different shapes or surface features.

The bicycle pedal 12 comprises at least one fastener 36. More specifically, the pedal body 16 comprises at least one fastener 36. Here, the at least one fastener 36 is a threaded fastener 36. Here, the at least one fastener 36 includes a plurality of fasteners 36. As seen in FIGS. 1, 12 and 13, the plurality of fasteners 36 attach the at least one tread part 34 to the body part 30. Here, a fastener 36 attaches a tread part 34 to the body part 30 by extending through the tread part 34 and threading into the body part 30.

As illustrated, the plurality of fasteners 36 do not need to all be the same. Here, the fasteners 36 include one or more first fastener 36A, one or more second fastener 36B, and one or more third fastener 36C. By mixing or rearranging different types of fasteners 36, a rider can customize the bicycle pedal 12 for the best shoe grip. As seen in FIGS. 12 and 13, different fastener configurations are used on the first side 30f and the second side 30g of the body part 30, thus enabling a rider to alternate between two different configurations by rotating the pedal body 16 to the opposite side. For example, in FIG. 12 the majority of the fasteners 36 are third fasteners 36C without spikes (7 of 12), whereas in FIG. 13 the majority of the fasteners 36 are first fasteners 36A with spikes (6 of 12) and second fasteners 36B with spikes (4 of 12), enabling the rider to alternate between a mostly spiked grip and a mostly non-spiked grip by rotating the pedal body 16.

The bicycle pedal 12 comprises a retaining part 38. More specifically, the pedal body 16 comprises the retaining part 38. The retaining part 38 is configured to retain the pedal body 16 with the bicycle crank 18 if the pedal shaft 14 breaks under the rider's load. Here, the body part 30 and the retaining part 38 are shown as separate parts, but in an alternative embodiment the body part 30 and the retaining part 38 can be formed together as a single part.

FIGS. 14 and 15 show the retaining part 38 in detail. As shown, the retaining part 38 includes a retaining portion 40. The retaining portion 40 retains the pedal body 16 with the bicycle crank 18 if the pedal shaft 14 breaks under the rider's load. As described in more detail below, the retaining portion 40 also contacts the intermediate portion 24 of the pedal shaft 14 when a rider applies a load. The retaining portion 40 can maintain a gap with the intermediate portion 24 of the pedal shaft 14 when a rider applies a load. The retaining part 38 includes a support portion 42. The support portion 42 attaches the retaining portion 40 to the body part 30. The support portion 42 also supports the retaining portion 40. More specifically, the support portion 42 attaches the retaining portion 40 to the body part 30 and thereafter supports the retaining portion 40 when the rider's load is applied. The retaining part 38 also includes at least one support fastener 44. The at least one support fastener 44 attaches the support portion 42 to the body part 30. The retaining portion 40 is configured to be attached to the body part 30 by the support portion 42 and the at least one support fastener 44, for example, by inserting the retaining portion 40 into the first gap 42 at the crank end side 30b of the body part 30 and placing the support fasteners 44 through fastening apertures 42a of the support portion 42 to attach the support portion 42 to the body part 30 at the crank end side 30b. Once attached, the retaining portion 40 is held in place between the body part 30 and the support portion 42 by the support fasteners 44.

As seen in FIG. 15, the retaining part 38 defines a pedal shaft receiving aperture 40a. Specifically, the retaining portion 40 includes the pedal shaft receiving aperture 40a. More specifically, the retaining portion 40 of the retaining part 38 includes a retaining section 40b defining the pedal shaft receiving aperture 40a. As seen in FIGS. 1 to 3, 5 and 6, the pedal shaft receiving aperture 40a receives the intermediate portion 24 of the pedal shaft 16 at a location outside of the pedal shaft receiving bore 31. The pedal shaft receiving aperture 40a of the retaining part 38 is positioned around the intermediate portion 24 of the pedal shaft 16. As seen in FIGS. 5 and 6, the first protrusion 26 extends radially outward with respect to the center axis CA to at least partially overlap with the retaining portion 40 of the retaining part 38 as viewed in the axial direction of the pedal shaft 14. This includes a case where the portion of the retaining portion 40 other than the pedal shaft receiving aperture 40a overlaps with the first protrusion 26. Here, the first protrusion 26 extends radially outward from the pedal shaft 14 in an area A2 between the second protrusion 27 and ¼ of the axial length of the pedal shaft 14. The retaining section 40b at least partially overlaps with the first protrusion 26 as viewed in the axial direction of the pedal shaft 14. For example, the shape of the pedal shaft receiving aperture 40a overlaps with the first protrusion 26. Thus, the retaining section 40b cannot be pulled past the first protrusion 26 towards the second end portion 22 in the axial direction of the center axis CA when the retaining part 38 is installed on the pedal shaft 14 as shown in FIG. 14. The second protrusion 27 extends radially outward with respect the center axis CA to at least partially overlap with the retaining portion 40 of the retaining part 38 as viewed in an axial direction of the pedal shaft 14. Thus, the retaining section 40b cannot be pulled past the second protrusion 27 towards the first end portion 20 in the axial direction of the center axis CA when the retaining part 38 is installed on the pedal shaft 14 as shown in FIG. 14.

The retaining part 38 includes a first side 38a and a second side 38b. The first side 38a splits from the second side 38b to position the pedal shaft receiving aperture 40a around the intermediate portion 24 of the pedal shaft 14. More specifically, the retaining portion 40 of the retaining part 38 splits to position the pedal shaft receiving aperture 40a around the intermediate portion 24 of the pedal shaft 14. Here, the first side 38a splits from the second side 38b at a pair of slits 40c (e.g., see FIGS. 10 and 15). As seen in FIGS. 14 and 15, the retaining part 38 includes at least one slit 40c that is arranged to provide radial expansion of the retaining part 38 to be installed onto the pedal shaft 14. More specifically, as seen in FIGS. 14 and 15, the retaining section 40b of the retaining portion 40 includes two of the slits 40c that are spaced 180° apart. Here, the retaining portion 40 has a plurality of slits that do not completely divide the retaining portion 40 but increase the ability of the retaining portion 40 to be stretched over the first protrusion 26. Alternatively, the slits 40c can be configured to enable the retaining portion 40 to be divided into two pieces in the lateral direction. The slits 40c enable the retaining section 40b to fit around the intermediate section 24 of the pedal shaft 14 despite the presence of the first protrusion 26. These ways, the pedal shaft receiving aperture 40a receives the intermediate portion 24 of the pedal shaft 14 as shown in FIG. 14. Then, the pedal shaft receiving aperture 40a at least partially encircles the intermediate portion 24 of the pedal shaft 14 around the center axis CA when the pedal shaft 14 is fully inserted into the body part 30.

The support portion 42 includes a pedal shaft receiving aperture 42b which is larger than the first protrusion 26, so the support portion 42 fits over the first protrusion 26 and holds the retaining portion 40 together around the pedal shaft 14 during use. The retaining portion 40 and the support portion 42 can be mounted on the pedal shaft 14 from the same direction. The diameter of the pedal shaft receiving aperture 42b is smaller than the outermost diameter of the second protrusion 27, so the support portion 42 cannot slip past the second protrusion towards the first end portion 20 in the axial direction of the center axis CA. That is, the support portion 42 at least partially overlaps the second protrusion 27 as viewed in the axial direction of the pedal shaft 14. During assembly, the support portion 42 does not fall out of the pedal shaft 14 due to the second protrusion 27.

In an embodiment, the retaining portion 40 can be made of multiple parts. For example, the retaining portion 40 can include separate parts for the first side 38a and the second side 38b. The part of the retaining portion 40 which at least partially overlaps the first protrusion 26 in the axial direction can also be a separate part from the retaining section 40b which includes the pedal shaft receiving aperture 40a. That is, a component different from the retaining section 40b having the pedal shaft receiving aperture 40a is arranged at a position where it overlaps with the first protrusion 26. In this case, the first protrusion 26 can pass through the pedal shaft receiving aperture 40a. However, due to the component which overlaps with the first protrusion 26, the pedal shaft 14 does not come off the retaining part 38.

As seen in FIG. 15, the retaining portion 40 also includes an entrance aperture 40d and two side walls 40e which create an exposing aperture 40f in a direction perpendicular to the center axis CA of the pedal shaft 14. The entrance aperture 40d encircles the pedal shaft 14 around the center axis CA between the exposed portion 28 and the second end portion 22 when the pedal shaft 14 is fully inserted into the body part 30. Here, as seen in FIG. 14, when the retaining part 38 is installed on the pedal shaft 14, the entrance aperture 40d encircles the pedal shaft 14 in an area A1 that is ⅖ to ⅗ of the axial length of the pedal shaft 14 from second protrusion 27. As seen in FIGS. 5 and 6, the entrance aperture 40d also protrudes into the first opening 31a of the pedal shaft receiving bore 31 when the retaining part 38 is attached to the body part 30. The side walls 40e align with and abut corresponding side walls 32a of the first gap 32 at the crank end side 30b of the body part 30 when the retaining part 38 is attached to the body part 30. The side walls 40e further include one or more mating feature 40g configured to mate with a corresponding one or more mating feature 32b on the corresponding side wall 32a of the first gap 32. Here, the mating feature 40g is one or more indentation extending longitudinally along each side wall 40e between the pedal shaft receiving aperture 40a and the entrance aperture 40d, and the corresponding mating feature 32b is a protrusion extending longitudinally along each side wall 32a and configured to protrude into the mating feature 40g. Here, the indent is a slit through the side wall 40e. Alternatively, the mating feature 40g can include a protrusion, and the corresponding mating feature 32b can include an indentation. When fully installed as shown in FIGS. 1 to 3, the exposing aperture 40f in the retaining part 38 forms a space which exposes the exposed portion 28 of the pedal shaft 14. Here, the exposed portion 28 of the pedal shaft 14 is exposed on both the first side 30f and the second side 30g of the body part 30.

As seen in FIGS. 2 and 3, the retaining part 38 is spaced axially from the first opening 31a of the pedal shaft receiving bore 31 along the center axis CA of the pedal shaft 14. More specifically, the inner surface of the pedal shaft receiving aperture 40a of the retaining part 38 which makes contact with the intermediate portion 24 of the pedal shaft 14 under a rider's load is spaced axially from the first opening 31a. The retaining part 38 is spaced axially by a distance D3 from the first opening 31a of the pedal shaft receiving bore 31 along the center axis CA of the pedal shaft 14. In FIGS. 2 and 3, this axial spacing distance D3 is shown across the exposing aperture 40f which exposes the exposed portion 28. In this way, the pedal shaft 14 has an exposed portion 28 that is disposed outside of the pedal body 16 between the retaining part 38 and the first opening 31a of the pedal shaft receiving bore 31. By creating the exposing aperture 40f with the exposed portion 28 of the pedal shaft 14, the rider's load is distributed away from the sliding bearings as discussed below.

Figure 8:
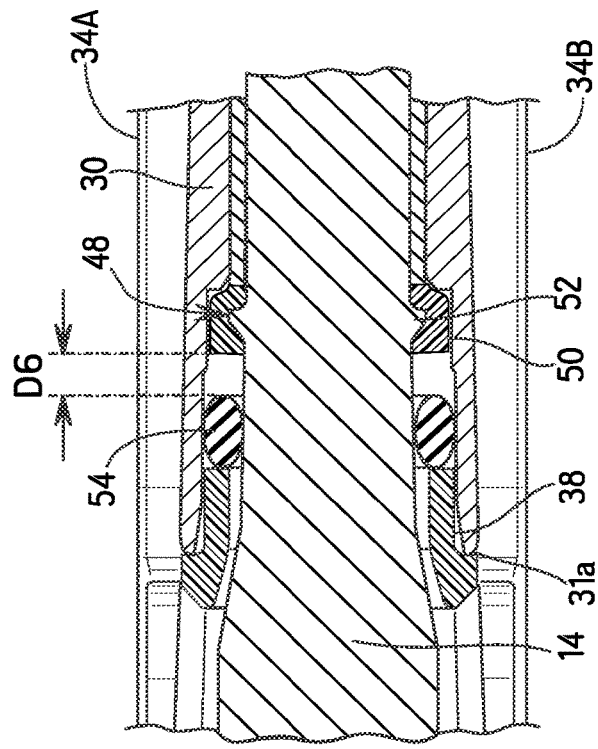
FIG. 8 is an enlarged view taken from a center portion of FIG. 6.
Figure 7:
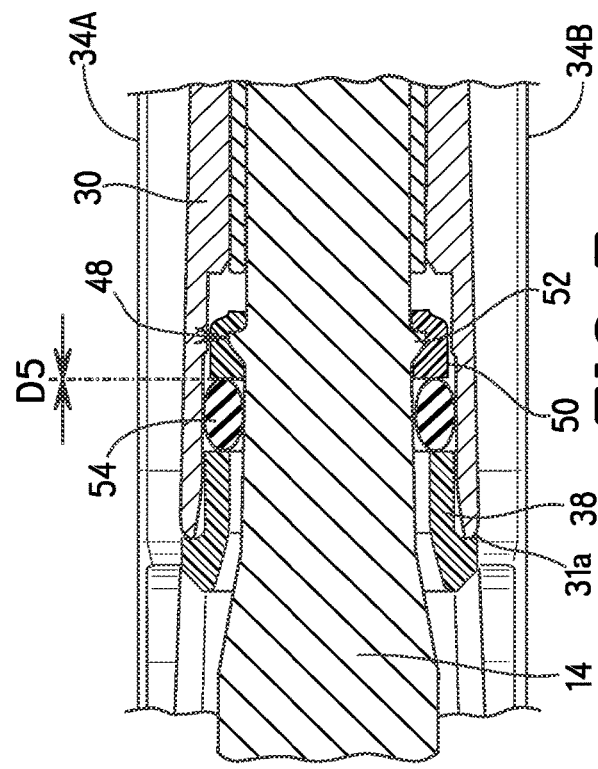
FIG. 7 is an enlarged view taken from a center portion of FIG. 5.

As seen in FIGS. 7 and 8, the bicycle pedal 12 comprises a first projection 48. The first projection 48 is provided to the pedal shaft 14. In an embodiment, the first projection 48 includes at least one of a first O-ring 50 and a protrusion 52. The protrusion 52 is provided on the pedal shaft 14. Here, the first projection 48 includes the protrusion 52 and the first O-ring 50. The protrusion 52 extends radially outward from the pedal shaft 14 with respect to the center axis CA. Here, as seen in FIG. 15, the protrusion 52 encircles the center axis CA with a constant diameter. The protrusion 52 can also include one or more gaps in its outermost diameter in the circumferential direction. The protrusion 52 can also extend radially outward from the pedal shaft 14 at a single point or multiple points. The first O-ring 50 is disposed on the protrusion 52. The first O-ring 50 can also be press-fitted onto the pedal shaft 14. In an embodiment, the first O-ring 50 can be made with resin such as polyoxymethylene (POM) or another resin material. Thus, a sealing function is not required of the first O-ring 50. However, the first O-ring 50 can be a sealing ring. The first O-ring 50 is a sealing ring. Thus, the first O-ring 50 can provide a sealing function to prevent water entry and fouling within the pedal shaft receiving bore 31. The first O-ring 50 can be omitted. The protrusion 52 serves as a substitute for the first O-ring 50.

The bicycle pedal 12 comprises a second projection 54. The second projection 54 is provided to the pedal shaft 14. As explained in more detail below, the pedal shaft 14 translates in the axial direction of the center axis CA with respect to the second projection 54. The first projection 48 also translates in the axial direction of the center axis CA with respect to the second projection 54. Here, the second projection 54 includes a second O-ring. The second O-ring is a sealing ring. Thus, the second O-ring can provide a sealing function to prevent water entry and fouling within the pedal shaft receiving bore 31. However, a sealing function is not required of the second O-ring. The second O-ring can be made with resin such as acrylonitrile-butadiene rubber (NBR) or another resin material.

As seen in FIGS. 5 to 8, the first projection 48 and the second projection 54 are located within the pedal shaft receiving bore 31. The first projection 48 and the second projection 54 are located proximal to the first opening 31a in comparison with the second opening 31b. The first projection 48 or the second projection 54 provides a sealing function to prevent water entry and fouling within the pedal shaft receiving bore 31. However, a sealing function is not required. The second protrusion 54 can be omitted. The end portion of the retaining part 38 on the second end portion 22 side serves as a substitute for the second projection 54.

The bicycle pedal 12 includes at least one sliding bearing 56. The body part 30 is rotatably supported by the at least one sliding bearing 56. Here, the at least one sliding bearing 56 includes a first sliding bearing 56A and a second sliding bearing 56B. The first sliding bearing 56A is disposed on the second end portion 22 of the pedal shaft 14. The second sliding bearing 56B is disposed between the first sliding bearing 56A and the intermediate portion 24. The bicycle pedal 12 is more effective in a case where the pedal shaft 14 is supported by at least two bearings 56 such as the first sliding bearing 56A and the second sliding bearing 56B. This is because in a case where there is one bearing (e.g., the first sliding bearing 56A) near the second end portion 22 of the pedal shaft 14, the axial length of the pedal shaft 14 from the first end portion 20 to a portion where the bearing is mounted on the pedal shaft 14 can be sufficiently long. Here, the bearing (e.g., the first sliding bearing 56A) is located at the small diameter portion of the pedal shaft 14. Then, by gradually reducing the diameter of the pedal shaft 14 from the first end portion 20 to the portion where the bearing (e.g., the first sliding bearing 56A) is mounted, the concentration of stress on the pedal shaft 14 is easily suppressed. Especially in a case where the two bearings 56A, 56B are separated from each other, the length of the reduced diameter portion becomes shorter and it becomes difficult to suppress the stress concentration on the pedal shaft 14.

When constructed as shown in FIG. 5 or 6, the first sliding bearing 56A and the second sliding bearing 56B enable smooth rotation of the pedal body 16 around the pedal shaft 14 with respect to the center axis CA. The at least one sliding bearing 56 is located in the center portion of the pedal shaft 14 in the axial direction. In this embodiment, the second sliding bearing 56B is located in the center portion of the pedal shaft 14 in the axial direction of the pedal shaft 14. Alternatively, for example, at least one bearing (e.g., the second sliding bearing 56B) can be located in an area A1 (see, FIGS. 14 and 15) that is ⅖ to ⅗ of the axial length of the pedal shaft 14 from second protrusion 27. Generally, the pedal shaft diameter of the bearing portion is small. Since the pedal shaft diameter from the second sliding bearing 56B to the second end portion 22 can be reduced, it is easy to reduce the thickness of the bicycle pedal 12.

The bicycle pedal 12 comprises an end washer 58. The end washer 58 is configured to decrease friction and create spacing at the tip of the second end portion 22 of the pedal shaft 14. The end washer 58 can be made, for example, with POM material.

Figure 10:
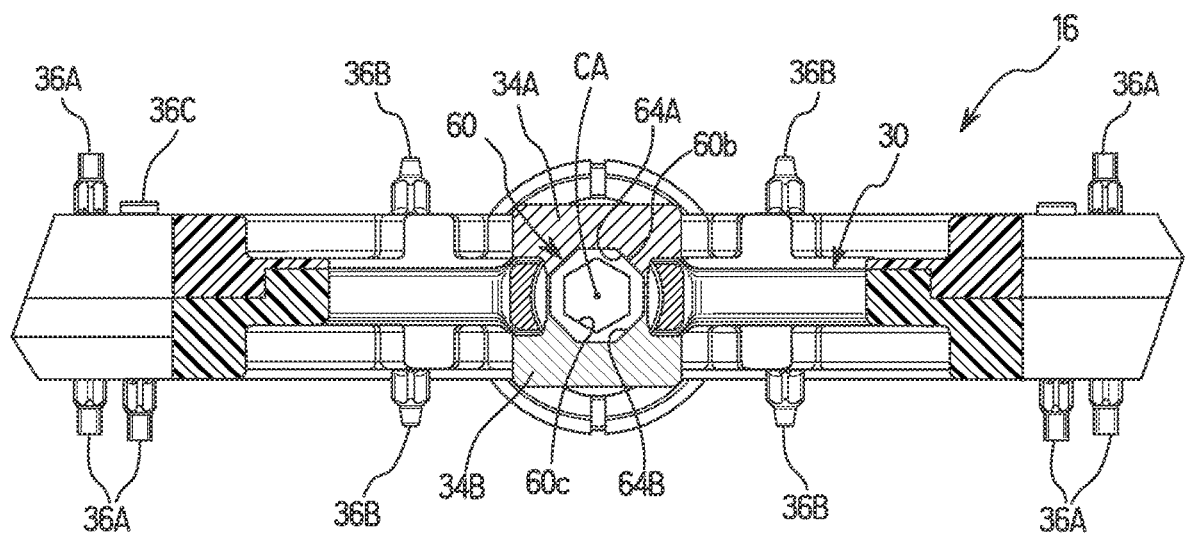
FIG. 10 is a side cross-sectional view of the bicycle pedal illustrated in FIG. 1 taken along a section line 10-10 in FIG. 2.

The bicycle pedal 12 comprises an end cap 60. The end cap 60 includes threads 60a which mate with corresponding threads on an inner surface of the second opening 31b. The end cap 60 has a non-cylindrical outer surface 60b that is at least partly located outside of the pedal shaft receiving bore 31. More specifically, the non-cylindrical outer surface 60b is at least partly located outside of the pedal shaft receiving bore 31 when the threads 60a are threaded into the second opening 31b. The non-cylindrical outer surface 60b is located within the second gap 33 when the threads 60a are threaded into the second opening 31b. The non-cylindrical outer surface 60b has a polygonal shape. Here, as seen in FIG. 10, the polygon shape is an octagonal shape. The end cap 60 also includes a non-cylindrical inner surface 60c. The non-cylindrical inner surface 60c is configured to receive a tool to enable the end cap 60 to be threaded into the second opening 31b. The non-cylindrical inner surface 60c is located on the same side of the end cap 60 as the non-cylindrical outer surface 60b. The end cap 60 can be made of metal. Further, the end cap 60 can be made of resin.

The end cap 60 is adjustably attached to the body part 30 at the second opening 31b to adjust a position of the pedal shaft 14 within the pedal shaft receiving bore 31 in an axial direction with respect to the center axis CA. This way, the end cap 60 enables the bicycle pedal 12 to be adjusted between multiple configurations. FIGS. 5 and 7 show the bicycle pedal 12 in a first configuration, while FIGS. 6 and 8 show the bicycle pedal 12 in a second confirmation. In the first configuration, the pedal shaft 14 is displaced with respect to the body part 30 in the axial direction of the center axis CA in comparison to the second configuration (e.g., the pedal shaft 14 is further to the right in FIGS. 6 and 8). Also, in the first configuration, the first projection 48 is displaced with respect to the body part 30 in the axial direction of the center axis CA in comparison to the first configuration (e.g., the first projection 48 is further to the right in FIGS. 6 and 8). Thus, the end cap 60 is adjustable with respect to the body part 30 to adjust a position of the first projection 48 in the axial direction with respect to the body part 30. As explained in more detail below, the rotational torque of the body part 30 with respect to the pedal shaft 14 is decreased in the second configuration in comparison to the first configuration. This causes the bicycle pedal 12 to spin more freely on the bicycle crank 18 in the second configuration in comparison the first configuration. The end cap 60 is also configured to seal off the second opening 31b and restrict unwanted dust and debris from entering the pedal shaft receiving bore 31.

To construct the bicycle pedal 12 in the first configuration shown in FIGS. 5 and 7, the first opening 31a of the body part 30 receives the second sliding bearing 56B, the first projection 48, the second projection 54, and the second end portion 22 of the pedal shaft 14 (e.g., during or after attachment of the retaining part 38 as seen in FIG. 14). The second opening 31b receives the first sliding bearing 56A, the end washer 58, and the end cap 60. Here, the end cap 60 is partially threaded into the second opening 31b of the pedal shaft receiving bore 31. The end cap 60 contacts the end washer 58, and the end washer 58 contacts the second end portion 22 of the pedal shaft 14, so the position of the end cap 60 in the axial direction of the center axis CA controls the position of the pedal shaft 14 in the axial direction of the center axis CA. It should be understood by those of ordinary skill in the art from this disclosure that alternate embodiments can enable the end cap 60 to directly contact the pedal shaft 14, or can include other intermediate elements between the end cap 60 and the pedal shaft 14 other than or in addition to the end washer 58.

To adjust the bicycle pedal 12 to the second configuration shown in FIGS. 6 and 8, the end cap 60 is unthreaded out of the second opening 31b of the pedal shaft receiving bore 31. As the end cap 60 moves in the axial direction of the center axis CA (e.g., right in FIGS. 5 to 8), the end cap 60 allows the pedal shaft 14 to move toward the second opening 31b in the axial direction of the center axis CA with respect to the body part 30. The first projection 48 is fixed to the pedal shaft 14 and thus also moves in the axial direction toward the second opening 31b. However, as seen in FIGS. 6 and 8, the retaining part 38 limits movement of the second projection 54 within the pedal shaft receiving bore 31 in the axial direction towards the first opening 31a. As the first projection 48 moves in the axial direction toward the first opening 31a, the second projection 54 is stationary with respect to the body part 30. Thus, the end cap 60 is adjustable with respect to the body part 30 to adjust a distance between the first projection 48 and the second projection 54 in the axial direction. More specifically, when the end cap 60 is threaded into the second opening 31b, the first projection 48 is pushed towards the second projection 54. Thus, the end cap 60 is adjustable with respect to the body part 30 to adjust the first projection 48 in the axial direction with respect to the body part 30 towards the second projection 54. As seen in FIGS. 5 and 7, the end cap 60 is configured to be threaded into the second opening 31b until the first projection 48 contacts or compresses the second projection 54. Thus, the end cap 60 is adjustable with respect to the body part 30 to cause the first projection 48 to contact the second projection 52. When the first projection 48 contacts the second projection 54, the rotational torque of the body part 30 with respect to the pedal shaft 14 is increased due to the first projection 48 rubbing against the second projection 54 during rotation of the body part 30 around the pedal shaft 14. In an embodiment, the retaining part 38 includes the second projection 54.

Once in the first configuration, the bicycle pedal 12 is configured to be adjusted to the second configuration by again adjusting the end cap 60 by threading the end cap 60 out of the second opening 31b in the axial direction. Here, the position of the pedal shaft 14 in the second configuration is determined by contact between the second end portion 22 of the pedal shaft 14 and the end washer 58. The position of the pedal shaft 14 in the second configuration is determined by contact between the first projection 48 and the second projection 54. It should further be understood from this disclosure that the bicycle pedal 12 is configured to be placed in multiple configurations between the first configuration and the second configuration. Each turn of the end cap 60 causes intermittent axial movement of the pedal shaft 14 to a new configuration. Here, the pitch of thread 60a is 1 mm. The non-cylindrical inner surface 60c of the end cap is an octagon shape, and a 45 degree turn of the end cap 60 with respect to the body part 30 is configured to shift the pedal shaft 14 by 0.125 mm in the axial direction of the center axis CA.

Here, in the second configuration, the clearance distance D6 between the first projection 48 and the second projection 54 in the axial direction of the center axis CA is set to be a positive value. In the first configuration, the clearance distance D5 between the first projection 48 and the second projection 54 in the axial direction of the center axis CA is set to be a negative value when the end cap 60 is fully threaded into the second opening 3 1b. More specifically, the clearance distance D5 is set to be between about −0.4 and 0 mm in the first configuration. Thus, in the first configuration with the end cap 60 fully threaded into the second opening 3 1b, the first projection 48 presses against the second projection 54 to cause the increase in rotational torque of the body part 30 with respect to the pedal shaft 14. By reducing the gap between the first projection 48 and the second projection 54 in an axial direction with respect to the center axis CA, it is possible to obtain a light rotary bicycle pedal with less axial movement of the pedal body 16 with respect to the pedal shaft 14. In the bicycle pedal 12 according to this embodiment, the gap between the first projection 48 and the second projection 54 in an axial direction with respect to the center axis CA can be adjusted intermittently at 0.125 mm.

Figure 11:
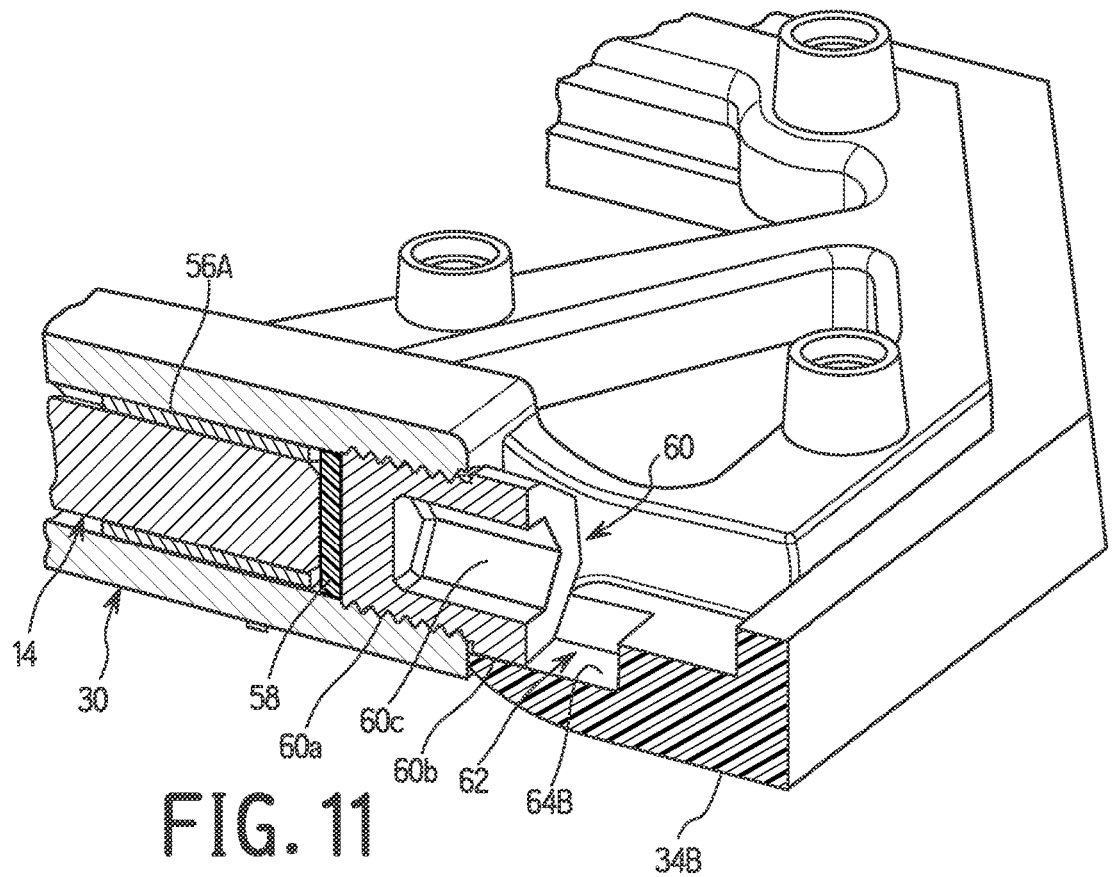
FIG. 11 is an enlarged cross-sectional perspective view of a portion of the bicycle pedal illustrated in FIG. 1 taken through the center axis of the pedal shaft.

Once the bicycle pedal 12 is adjusted to the desired configuration, the at least one tread part 36 is configured to be attached to the body part 30. The at least one tread part 36 is further configured to enable the multiple configurations of the bicycle pedal 12. As seen in FIGS. 10 and 11, the at least one tread part 36 has a recess 62 with an inner surface 64 that at least partially mates with the non-cylindrical outer surface 60b of the end cap 60. As shown, the at least one tread part 36 includes a first tread part 34A having a first inner surface 64A which mates with the non-cylindrical outer surface 60b of the end cap 60 and a second tread part 34B having a second inner surface 64B which mates with the non-cylindrical outer surface 60b of the end cap 60. Thus, as long as the end cap 60 is rotated to a position as shown in FIG. 10, the first inner surface 64A and the second inner surface 64B mate with the non-cylindrical outer surface 60b on opposite sides of the non-cylindrical outer surface 60b. The tread parts 34 therefore help control the intermittent adjustment of the end cap 60. Here, the non-cylindrical outer surface 60b of the end cap 60 is shown as having a decagon shape. However, the non-cylindrical outer surface 60b of the end cap 60 can have other non-cylindrical shapes. The pitch of thread 60a is 1 mm. When the non-cylindrical outer surface 60b of the end cap 60 has an octagon shape, an intermittent axial movement distance of the end cap 54 is, for example, 0.125 mm for a 45° turn of the end cap 60.

FIGS. 12 and 13 further illustrate the attachment of the tread parts 34 to the body part 30. As illustrated, a tread part 34 is attached to the body part 30 by at least one fastener 36. Here, the first tread part 34A is attached to the first side 30f of the body part 30 by at least some of the plurality of fasteners 36. Likewise, the second tread part 34B is attached to the second side 30g of the body part 30 by at least some of the plurality of fasteners 36. The fasteners 36 are configured to pass through a through-hole 66 in the tread part 34 and thread into a fixing hole 68 in the body part 30. By inserting a fastener 36 through each of the through-holes 66 and into each of the fixing holes 68, the tread part 34 can be removably attached to the body part 30. When installed, the first tread part 34A fills in the second gap 33 and covers the end cap 60 on the first side 30f of the body part 30. Likewise, the second tread part 34B fills in the second gap 33 and covers the end cap 60 on the second side 30g of the body part 30. Thus, the end cap 60 cannot be adjusted with the tread parts installed. Also, the tread parts 34 do not cover the center portion 30a of the body part 30 in the illustrated embodiment, thus enabling the pedal body 16 to be formed as thin as possible with enough room in the center portion 30a to receive the pedal shaft 14.

Once the bicycle pedal 12 is configured as desired, the bicycle pedal 12 is configured to be attached to the bicycle crank 18 and operate in a no load condition or under a load. FIGS. 5 and 6 show a no load condition in which a rider is not pressing downwardly on the pedal body 16. Here, the retaining part 38 is located at a position corresponding to the intermediate portion 24 of the pedal shaft 14 along the center axis CA. More specifically, the pedal shaft receiving aperture 40a encircles the intermediate portion 24 of the pedal shaft 14 along the center axis CA. In this configuration, the retaining part 38 is configured to receive a load from the intermediate portion 24 of the pedal shaft 14 when a load is applied. The retaining part 38 is configured to receive the load when a rider presses downwardly on the pedal body 16. Here, the retaining part 38 is at least partly spaced from the intermediate portion 24 under the no load condition. More specifically, the inner surface of the pedal shaft receiving aperture 40a of the retaining part 38 is at least partly spaced from the intermediate portion 24 under the no load condition. The retaining part 38 is at least partly spaced from the intermediate portion 24 by a distance D4 under the no load condition. For example, the distance D4 can range from 0.2 mm to 0.8 mm. More suitably, the distance D4 can range from 0.3 mm to 0.6 mm. The distance D4 is taken in a direction perpendicular to the center axis CA. The distance D4 can also exist under a predetermined load condition in which a load applied to the pedal body 16 does not exceed a predetermined value. When the distance D4 exists under the predetermined load condition, a first portion and a second portion support the pedal body 16 on the bicycle crank 18. The first portion is located at the first end portion 20 on the pedal shaft 14. The second portion is located within the pedal shaft receiving bore 31 proximal to the second end portion 22 on the pedal shaft 14. The predetermined load is a load in a case where the retaining part 38 is not in contact with the intermediate portion 24 of the pedal shaft 14. For the predetermined load, the first portion receives a greater load than the second portion.

FIG. 9 shows a load being applied to the pedal body 16 by the rider. Here, the bicycle pedal 12 is being used while in the first configuration corresponding to FIG. 5. When the load is applied to the pedal body 16 from a rider, the retaining part 38 contacts the intermediate portion 24 of the pedal shaft 14. More specifically, the retaining part 38 contacts the pedal shaft 14 at the location L1 between the first protrusion 26 and the second protrusion 27. At the location L1, the retaining part 38 at the inner surface of the pedal shaft receiving aperture 40a contacts the intermediate portion 24 upon the load applied to the pedal body 16 from the rider. In doing so, the retaining part 38 absorbs at least a portion of a force applied to the pedal body 16 in a direction perpendicular to the center axis CA of the pedal shaft 14. For example, the direction perpendicular to the center axis CA is a downward direction in FIG. 9. The force can be due to a rider stepping onto the pedal body 16. For example, the force can be greater than a pedaling force that is applied by the rider sitting on a saddle. For example, the force can be the pedaling force that is applied by a rider standing from the saddle. The pedaling force applied by the rider sitting on the saddle can be less than the predetermined value under the predetermined load condition. That is, the pedal shaft 14 is configured to contact the retaining part 38 in a case where the force exceeds a predetermined value while the rider is biking. The predetermined value is a force value that is greater than a certain value that occurs in a case where the rider is biking. The contact at the location L1 is caused, for example, as the exposed portion 28 of the pedal shaft 14 bends slightly within the exposing aperture 40f under the force from the rider. Thus, by exposing the exposed portion 28 as discussed herein, and by aligning the intermediate portion 24 with the inner surface of the pedal shaft receiving aperture 40a as shown, the load from the rider is distributed to the retaining part 38. A large force applied by the rider occurs, for example, in a case where a large force is applied from the outside of the bicycle. A large force applied from the outside of the bicycle is, for example, an impact force generated in a case of going down the stairs by the bicycle.

Since the retaining part 38 and the intermediate portion 24 contact each other during a load condition, at least one of the retaining part 38 and the intermediate portion 24 can include resin material. The resin material can be, for example, nylon or POM. Here, the retaining part 38 is made of resin material. The resin material is advantageous because resin material does not easily wear due to contact with the pedal shaft 14, which is typically a metal material such as carbon steel or chrome molybdenum steel. Here, the support portion 42 includes a metallic material. The metallic material of the support portion 42 adds rigidity and strength to the retaining part 38 and holds the retaining portion 40 in place when contact is made with the intermediate portion 24 of the pedal shaft 14.

The bicycle pedal 12 is configured to retain the pedal body 16 with the bicycle crank 18 even if the pedal shaft 14 breaks during use. More specifically, the retaining part 38 is configured to retain the body part 30 with the bicycle crank 18 even if the pedal shaft 14 breaks during use. Even if the pedal shaft 14 breaks in an area of maximum load, the retaining section 40b of the retaining portion 40 stays inside of the first protrusion 26 in the axial direction of the center axis CA with respect to the bicycle crank arm 18 so that the pedal body 16 does not fall off of the bicycle crank 18. This is because the first protrusion 26 at least partially overlaps with the retaining section 40b as viewed in the axial direction. The retaining section 40b of the retaining portion 40 also stays outside of the second protrusion 27 in the axial direction of the center axis CA with respect to the bicycle crank arm 18 so that the pedal body 16 does not separate from the intermediate portion 24 of the pedal shaft 14. In other words, the retaining section 40b of the retaining portion 40 stays between the first protrusion 26 and the second protrusion 27 in the axial direction of the center axis CA. Here, it is assumed that the pedal shaft 14 is damaged at the exposed portion 28. This is because in a case where the bicycle shaft 14 is bent, a largest stress is applied to the exposed portion 28.

Figure 19:
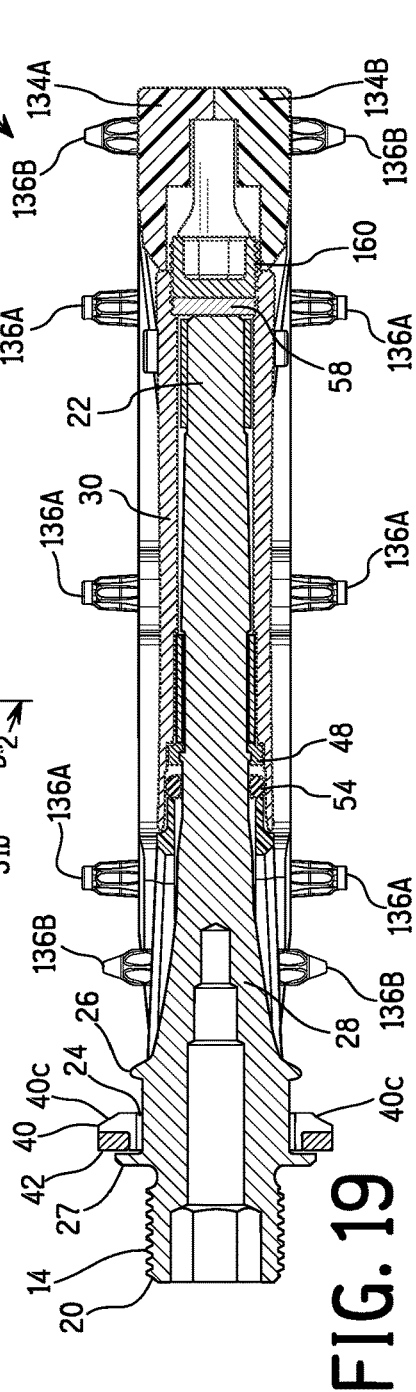
FIG. 19 is a side cross-sectional view of a bicycle pedal in accordance with a second embodiment.

Referring now to FIG. 19, a bicycle pedal 112 in accordance with a second embodiment will be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The main difference between the bicycle pedal 112 of FIG. 19 and the bicycle pedal 12 of FIGS. 1 to 18 is that the bicycle pedal 112 uses an alternative end cap 160 that has a cylindrical outer surface, not a polygonal outer surface. However, the end cap 160 is still configured to adjust the pedal shaft 14 and first projection 48 as discussed above. Since the end cap 160 has a cylindrical outer surface instead of a polygonal outer surface, the bicycle pedal 112 includes a first tread part 134A and a second tread part 134B which do not need recesses to mate with a polygonal outer surface. The end cap 160 can be fixed to the second opening 31b with an adhesive, in a case where the polygonal positioning structure of the end cap 160 is not adopted. The bicycle pedal 112 further includes first fasteners 136A and second fasteners 136B which are configured differently than the bicycle pedal 12. It should be understood by those of ordinary skill in the art from this disclosure that any of the features of bicycle pedal 112 can be added to the bicycle pedal 12 of the first embodiment, and vice versa.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the bicycle pedal. Accordingly, these directional terms, as utilized to describe the bicycle pedal should be interpreted relative to a human-powered vehicle field (e.g., bicycle) in an upright riding position on a horizontal surface and that is equipped with the bicycle pedal. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
a pedal shaft having a center axis and an axial length extending along the center axis;
a body part rotatably supported by the pedal shaft around the center axis, the body part having a pedal shaft receiving bore with a first opening and a second opening, the first opening receiving the pedal shaft along the center axis; and
an end cap adjustably attached to the body part at the second opening to adjust a position of the pedal shaft within the pedal shaft receiving bore in an axial direction with respect to the center axis, the end cap threaded into the second opening to push a tip of the pedal shaft in the axial direction by causing the tip of the pedal shaft to be contacted at an end of the axial length of the pedal shaft.

2. The bicycle pedal according to claim 1, further comprising
a first projection provided to the pedal shaft, and
the end cap being adjustable with respect to the body part to adjust a position of the first projection in the axial direction with respect to the body part.

3. The bicycle pedal according to claim 2, wherein
the first projection includes at least one of a first O-ring and a protrusion, and t protrusion is provided on the pedal shaft.

4. The bicycle pedal according to claim 3, wherein
the first projection includes the protrusion and the first O-ring, and
the first O-ring is disposed on the protrusion.

5. The bicycle pedal according to claim 3, wherein the first O-ring is a sealing ring.

6. The bicycle pedal according to claim 1, wherein the end cap has a non-cylindrical outer surface that is at least partly located outside of the pedal shaft receiving bore.

7. The bicycle pedal according to claim 6, wherein the non-cylindrical outer surface has a polygonal shape.

8. A bicycle pedal comprising:
a pedal shaft having a center axis;
a first projection provided to the pedal shaft;
a second projection provided to the pedal shaft;
a body part rotatably supported by the pedal shaft around the center axis, the body part having a pedal shaft receiving bore with a first opening and a second opening, the first opening receiving the pedal shaft along the center axis;
an end cap adjustably attached to the body part at the second opening to adjust a position of the pedal shaft within the pedal shaft receiving bore in an axial direction with respect to the center axis, the end cap being adjustable with respect to the body part to adjust a distance between the first projection and the second projection in the axial direction.

9. The bicycle pedal according to claim 8, further comprising
a retaining part that limits movement of the second projection within the pedal shaft receiving bore in the axial direction towards the first opening, and
the end cap being adjustable with respect to the both part to adjust the first projection in the axial direction with respect to the body part towards the second projection.

10. The bicycle pedal according to claim 9, wherein the second projection includes a second O-ring.

11. The bicycle pedal according to claim 10, wherein the second O-ring is a sealing ring.

12. The bicycle pedal according to claim 8, wherein the end cap is adjustable with respect to the body part to cause the first projection to contact the second projection.

13. The bicycle pedal according to claim 8, wherein the first projection and the second projection are located within the pedal shaft receiving bore.

14. A bicycle pedal comprising:
a pedal shaft having a center axis;
a body part rotatably supported by the pedal shaft around the center axis, the body part having a pedal shaft receiving bore with a first opening and a second opening, the first opening receiving the pedal shaft along the center axis; and
an end cap adjustably attached to the body part at the second opening to adjust a position of the pedal shaft within the pedal shaft receiving bore in an axial direction with respect to the center axis, the end cap having a non-cylindrical outer surface that is at least partly located outside of the pedal shaft receiving bore; and
at least one tread part attached to the body part, the at least one tread part having a recess with an inner surface that at least partially mates with the non-cylindrical outer surface of the end cap.

15. The bicycle pedal according to claim 14, wherein the at least one tread part includes a first tread part having a first inner surface which mates with the non-cylindrical outer surface of the end cap and a second tread part having a second inner surface which mates with the non-cylindrical outer surface of the end cap.

16. The bicycle pedal according to claim 14, wherein the non-cylindrical outer surface has a polygonal shape.

17. A bicycle pedal comprising:
a pedal shaft having a first end portion, a second end portion, an intermediate portion and a first protrusion extending radially outward with respect to a center axis of the pedal shaft, the first protrusion being located between the first end portion and the second end portion; and
a pedal body rotatably supported by the pedal shaft around the center axis, the pedal body including a body part defining a pedal shaft receiving bore receiving the second end portion of the pedal shaft and a retaining part defining a pedal shaft receiving aperture receiving the inter mediate portion of the pedal shaft at a location outside of the pedal shaft receiving bore such that an exposed portion of the pedal shaft is exposed outside the pedal body between the intermediate portion and the second end portion;
the first protrusion extending radially outward with respect to the center axis to at least partially overlap with a retaining portion of the retaining part as viewed in an axial direction of the pedal shaft.

18. The bicycle pedal according to claim 17, wherein the retaining portion of the retaining part includes a retaining section defining the pedal shaft receiving aperture, and
the retaining section at least partially overlaps with the first protrusion as viewed in the axial direction of the pedal shaft.

19. A bicycle pedal comprising:
a pedal shaft having a first end portion, a second end portion, an intermediate portion and a first protrusion extending radially outward with respect to a center axis of the pedal shaft, the first protrusion being located between the first end portion and the second end portion; and
a pedal body rotatably supported by the pedal shaft around the center axis, the pedal body including a body part defining a pedal shaft receiving bore receiving the second end portion of the pedal shaft and a retaining part defining a pedal shaft receiving aperture receiving the intermediate portion of the pedal shaft at a location outside of the pedal shaft receiving bore,
the first protrusion extending radially outward with respect to the center axis to at least partially overlap with a retaining portion of the retaining part as viewed in an axial direction of the pedal shaft,
the retaining part including at least one slit that is arranged to provide radial expansion of the retaining part.

20. The bicycle pedal according to claim 19, wherein the retaining part includes a first side and a second side, and
the first side splits from the second side at the at least one slit to position the pedal shaft receiving aperture around the intermediate portion of the pedal shaft.

21. The bicycle pedal according to claim 19, wherein the at least one slit does not completely divide the retaining portion.

22. The bicycle pedal according to claim 19, wherein the at least one slit enables the retaining portion to be divided into two pieces.

23. A bicycle pedal comprising:
a pedal shaft having a first end portion, a second end portion, an intermediate portion and a first protrusion extending radially outward with respect to a center axis of the pedal shaft, the first protrusion being located between the first end portion and the second end portion; and a pedal body rotatably supported by the pedal shaft around the center axis, the pedal body including a body part defining a pedal shaft receiving bore receiving the second end portion of the pedal shaft and a retaining part defining a pedal shaft receiving aperture receiving the intermediate portion of the pedal shaft at a location outside of the pedal shaft receiving bore, the first protrusion extending radially outward with respect to the center axis to at least partially overlap with a retaining portion of the retaining part as viewed in an axial direction of the pedal shaft, the pedal shaft having a second protrusion extending radially outward with respect to the center axis, the pedal shaft receiving aperture of the retaining part positioned around the intermediate portion of the pedal shaft, and the intermediate portion positioned between the first protrusion and the second protrusion.

24. The bicycle pedal according to claim 23, wherein the second protrusion extends radially outward with respect to the center axis to at least partially overlap with the retaining portion of the retaining part as viewed in the axial direction of the pedal shaft.

25. A bicycle pedal comprising:

a pedal shaft having a first end portion, a second end portion, an intermediate portion and a first protrusion extending radially outward with respect to a center axis of the pedal shaft, the first protrusion being located between the first end portion and the second end portion; and a pedal body rotatably supported by the pedal shaft around the center axis, the pedal body including a body part defining a pedal shaft receiving bore receiving the second end portion of the pedal shaft and a retaining part defining a pedal shaft receiving aperture receiving the intermediate portion of the pedal shaft at a location outside of the pedal shaft receiving bore, the first protrusion extending radially outward with respect to the center axis to at least partially overlap with a retaining portion of the retaining part as viewed in an axial direction of the pedal shaft, the retaining part including a support portion, the retaining portion including the pedal shaft receiving aperture, and the support portion attaches the retaining portion to the body part.

* * * * *